(12) United States Patent
Kawashima

(10) Patent No.: US 8,234,600 B2
(45) Date of Patent: Jul. 31, 2012

(54) COMPUTER READABLE STORAGE MEDIUM STORING PROGRAM FOR GENERATING RETICLE DATA, AND METHOD OF GENERATING RETICLE DATA

(75) Inventor: Miyoko Kawashima, Haga-gun (JP)

(73) Assignee: Canon Kabushiki Kaisha (JP)

( * ) Notice: Subject to any disclaimer, the term of this patent is extended or adjusted under 35 U.S.C. 154(b) by 283 days.

(21) Appl. No.: 12/684,675

(22) Filed: Jan. 8, 2010

(65) Prior Publication Data

US 2010/0180252 A1 Jul. 15, 2010

(30) Foreign Application Priority Data

Jan. 9, 2009 (JP) ................................. 2009-003996

(51) Int. Cl.
*G06F 17/50* (2006.01)
*G03F 1/00* (2006.01)
*G03C 5/00* (2006.01)

(52) U.S. Cl. ................ 716/55; 716/50; 716/51; 716/52; 716/53; 716/54; 716/56; 716/126; 716/139; 430/5; 430/30; 430/326

(58) Field of Classification Search .............. 716/50–56, 716/126; 430/5, 30, 326
See application file for complete search history.

(56) References Cited

U.S. PATENT DOCUMENTS

| | | | |
|---|---|---|---|
| 6,563,566 B2 * | 5/2003 | Rosenbluth et al. | 355/67 |
| 6,670,080 B2 * | 12/2003 | Sugita et al. | 430/5 |
| 6,807,654 B2 * | 10/2004 | Akutagawa et al. | 716/52 |
| 6,968,531 B2 * | 11/2005 | Iiduka et al. | 716/53 |
| 7,506,299 B2 | 3/2009 | Socha et al. | |
| 7,512,928 B2 * | 3/2009 | Jessen et al. | 716/53 |
| 7,523,438 B2 * | 4/2009 | Hsu et al. | 716/54 |
| 7,550,235 B2 | 6/2009 | Shi et al. | |
| 7,594,199 B2 | 9/2009 | Socha et al. | |

(Continued)

FOREIGN PATENT DOCUMENTS

JP 2004-221594 A 8/2004

(Continued)

OTHER PUBLICATIONS

"Method of Generating Reticle Data, Memory Medium Storing Program for Generating Reticle Data, and Method of Producing Reticle", Yoshinari Higaki et al., Specification and Drawings of unpublished related co-pending U.S. Appl. No. 12/685,275, filed Jan. 11, 2010 pp. 1-82.

(Continued)

*Primary Examiner* — Helen Rossoshek
(74) *Attorney, Agent, or Firm* — Rossi, Kimms & McDowell LLP

(57) ABSTRACT

A computer readable storage medium stores a program for generating reticle data for producing a reticle used in an exposure apparatus, the program including the steps of classifying target patterns to be formed on a substrate into a plurality of direction groups, extracting, for each of the plurality of direction groups, a region suited to resolution of a target pattern belonging to the direction group from an effective light source distribution formed on a pupil of a projection optical system by an illumination optical system, thereby determining the extracted region as a partial light source, executing, for each of a plurality of partial light sources determined in the step of extracting a region, processing of determining a pattern to be placed on a reticle when each partial light source is used as an illumination condition, and merging patterns determined in the step of executing processing.

9 Claims, 26 Drawing Sheets

U.S. PATENT DOCUMENTS

| | | | |
|---|---|---|---|
| 7,608,468 B1* | 10/2009 | Ghinovker et al. | 438/16 |
| 7,700,247 B2* | 4/2010 | Ausschnitt | 430/30 |
| 7,712,070 B2* | 5/2010 | Moon | 716/50 |
| 7,723,230 B2* | 5/2010 | Setta | 438/671 |
| 7,725,872 B2* | 5/2010 | Hsu et al. | 716/50 |
| 7,781,748 B2* | 8/2010 | Platzgummer | 250/492.22 |
| 7,876,438 B2* | 1/2011 | Ghinovker et al. | 356/388 |
| 7,927,773 B2* | 4/2011 | Hakko | 430/30 |
| 8,020,135 B2* | 9/2011 | Fujimura et al. | 716/126 |
| 8,059,262 B2* | 11/2011 | Yamazoe | 355/77 |
| 8,060,842 B2* | 11/2011 | Socha | 716/50 |
| 2008/0052334 A1 | 2/2008 | Yamazoe | |
| 2009/0074287 A1* | 3/2009 | Kawashima | 382/144 |
| 2009/0077527 A1* | 3/2009 | Gergov et al. | 716/21 |
| 2010/0009272 A1* | 1/2010 | Kawashima | 430/5 |
| 2010/0178621 A1* | 7/2010 | Hakko et al. | 430/325 |
| 2010/0183959 A1* | 7/2010 | Higaki et al. | 430/5 |
| 2010/0186000 A1* | 7/2010 | Sezginer et al. | 716/20 |
| 2011/0032499 A1* | 2/2011 | Kawashima | 355/53 |
| 2011/0107280 A1* | 5/2011 | Liu et al. | 716/53 |
| 2011/0122394 A1* | 5/2011 | Kawashima et al. | 355/77 |
| 2012/0019805 A1* | 1/2012 | Yamazoe | 355/77 |

FOREIGN PATENT DOCUMENTS

| | | |
|---|---|---|
| JP | 2005-183981 A | 7/2005 |
| JP | 2008-040470 A | 2/2008 |

OTHER PUBLICATIONS

Office Action issued Oct. 24, 2011 for related US2010/0183959.

* cited by examiner

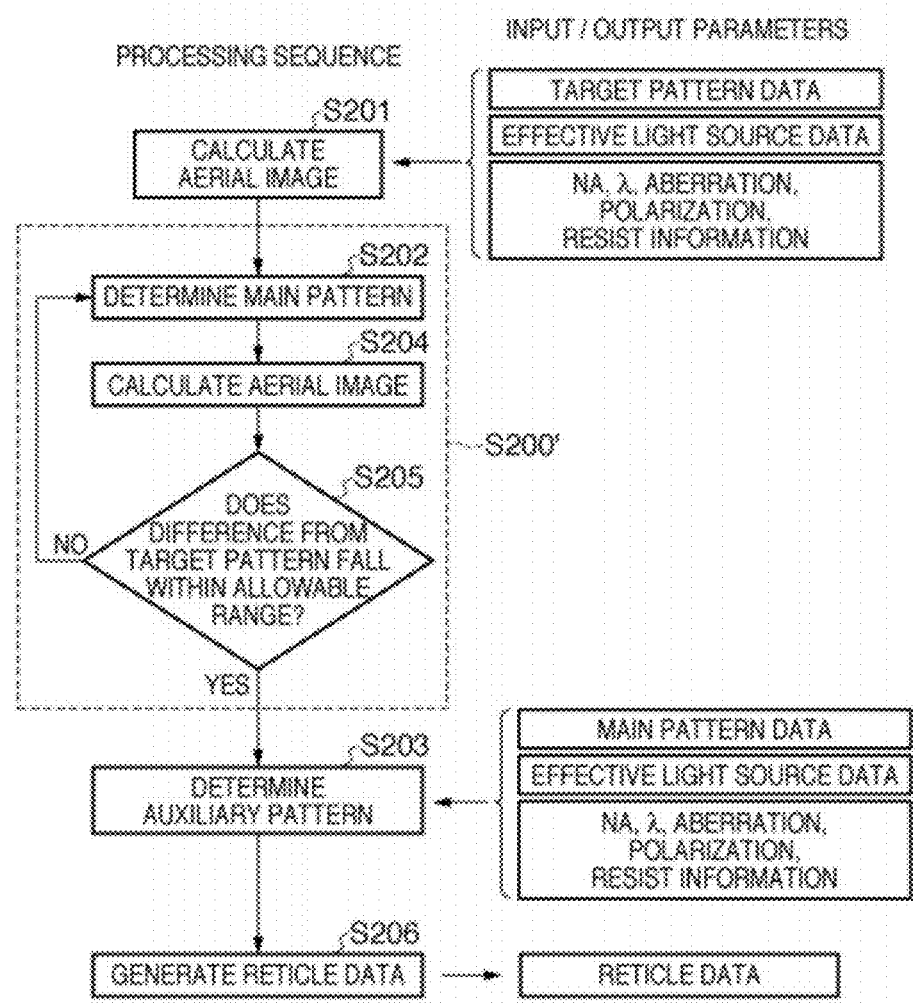

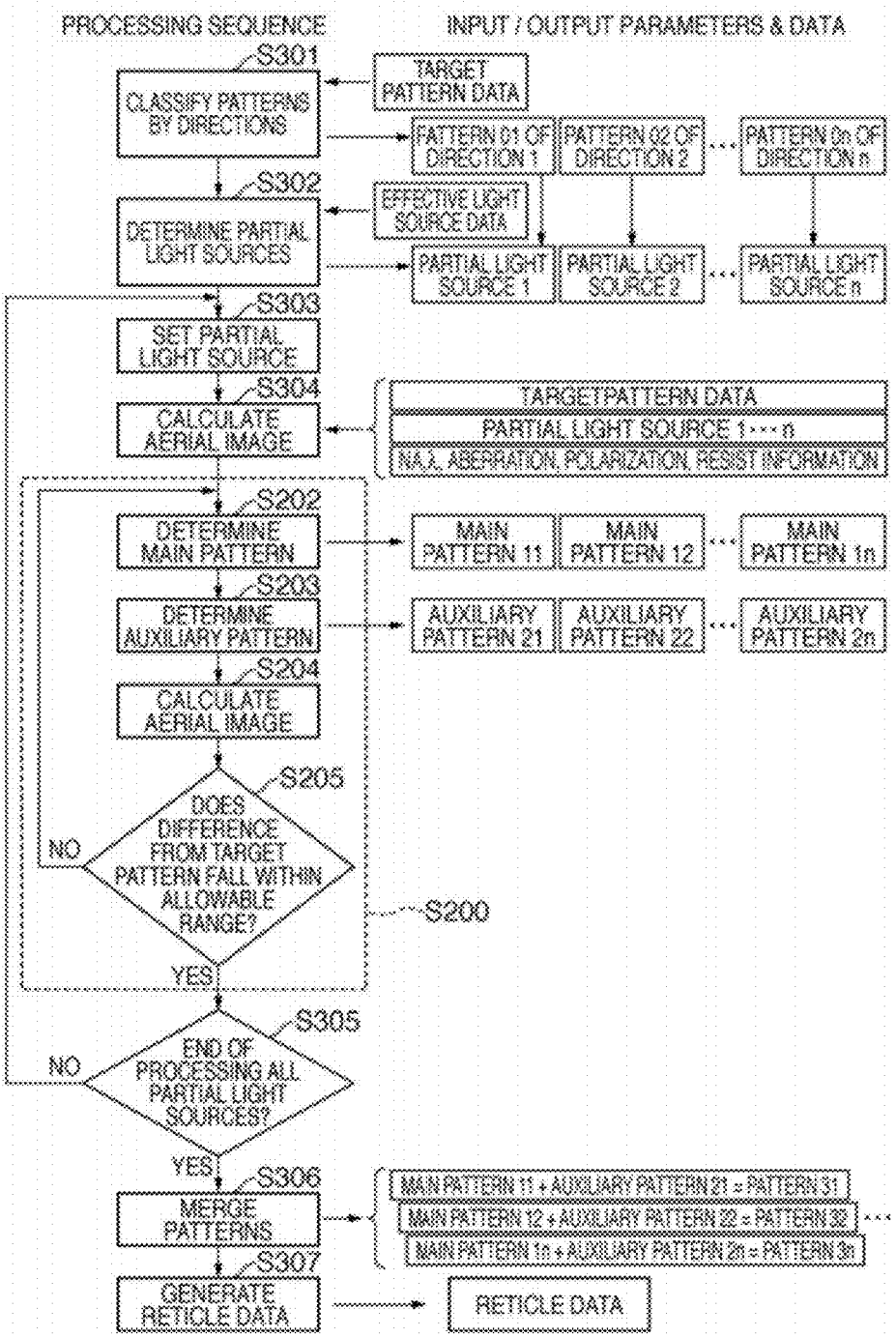

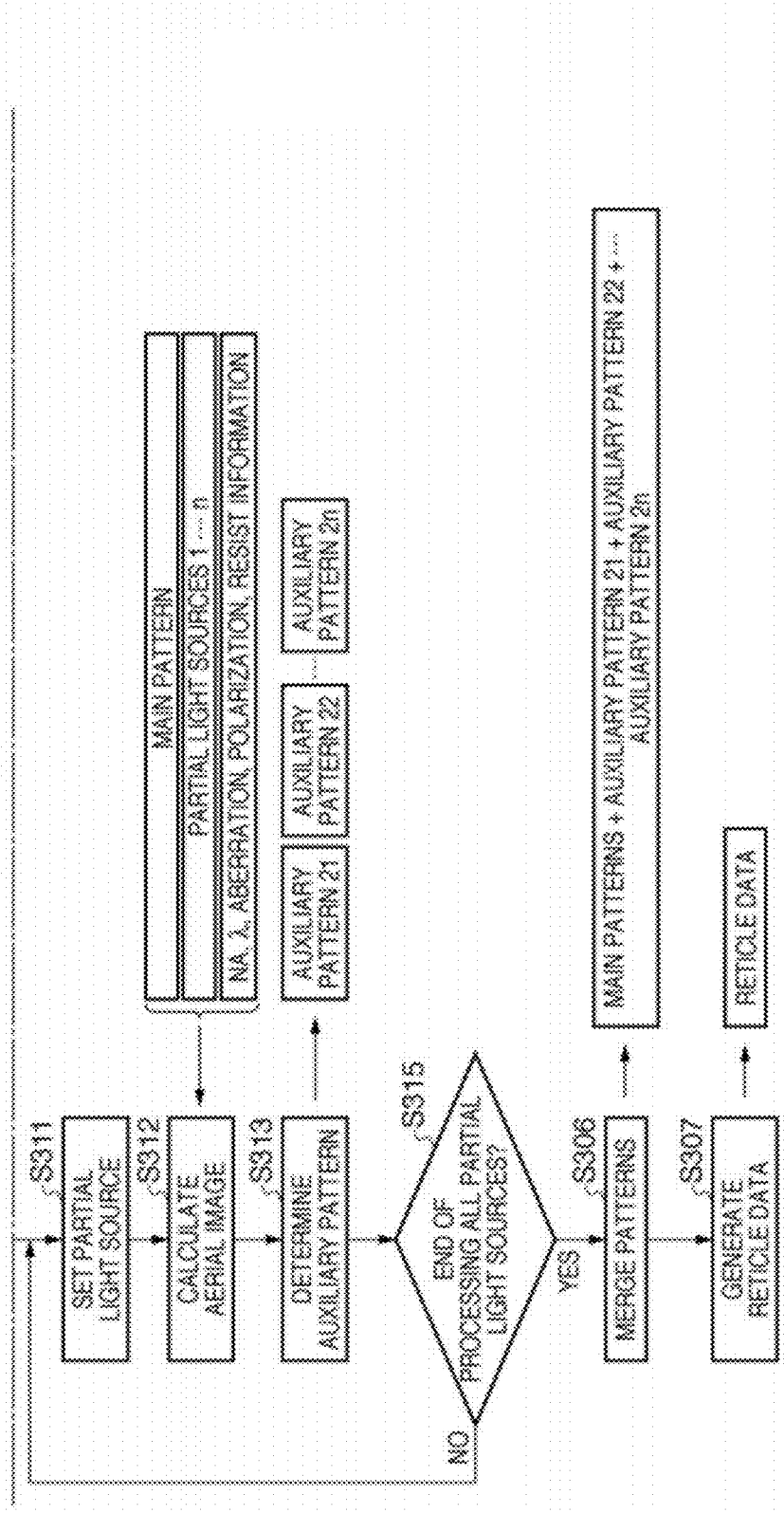

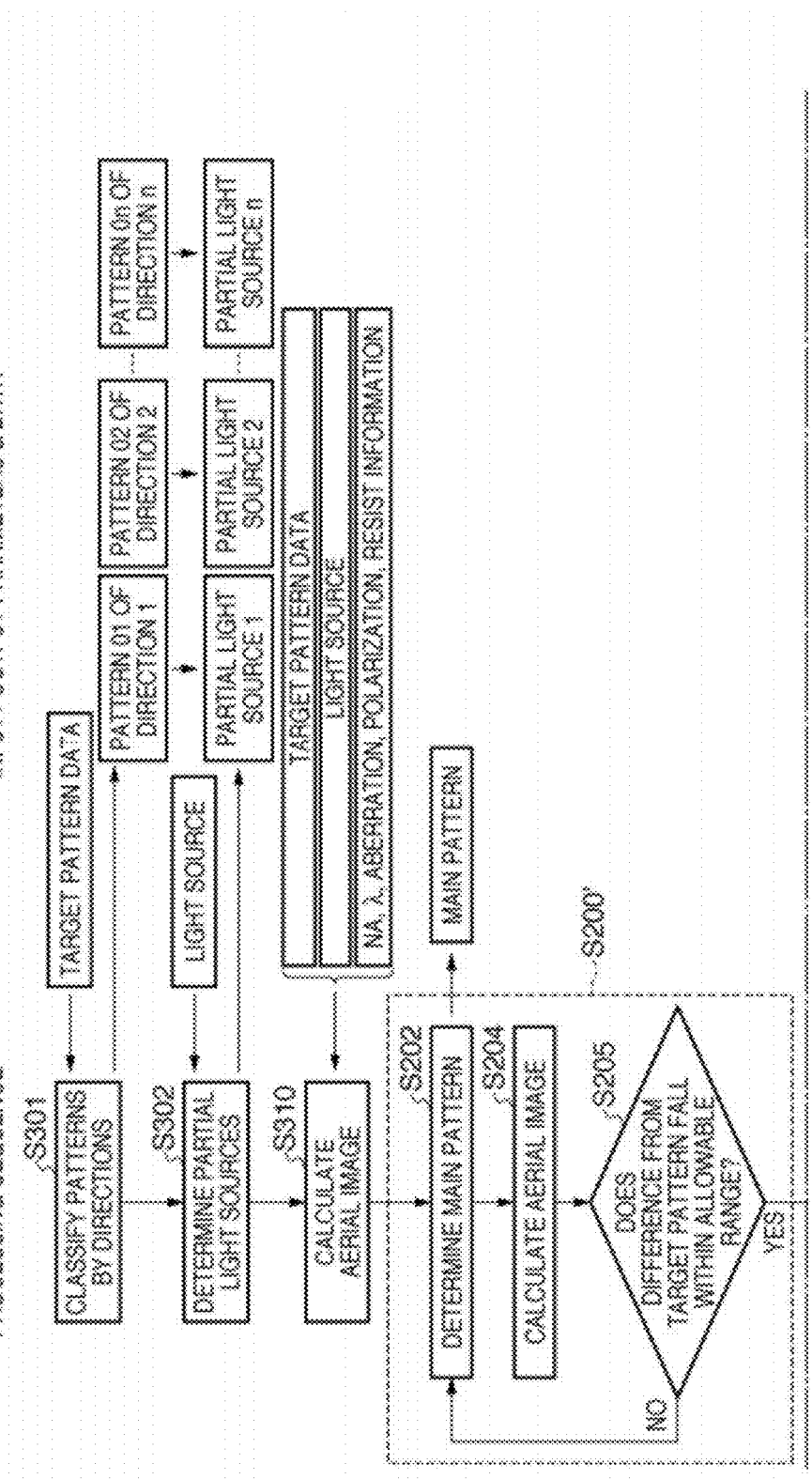

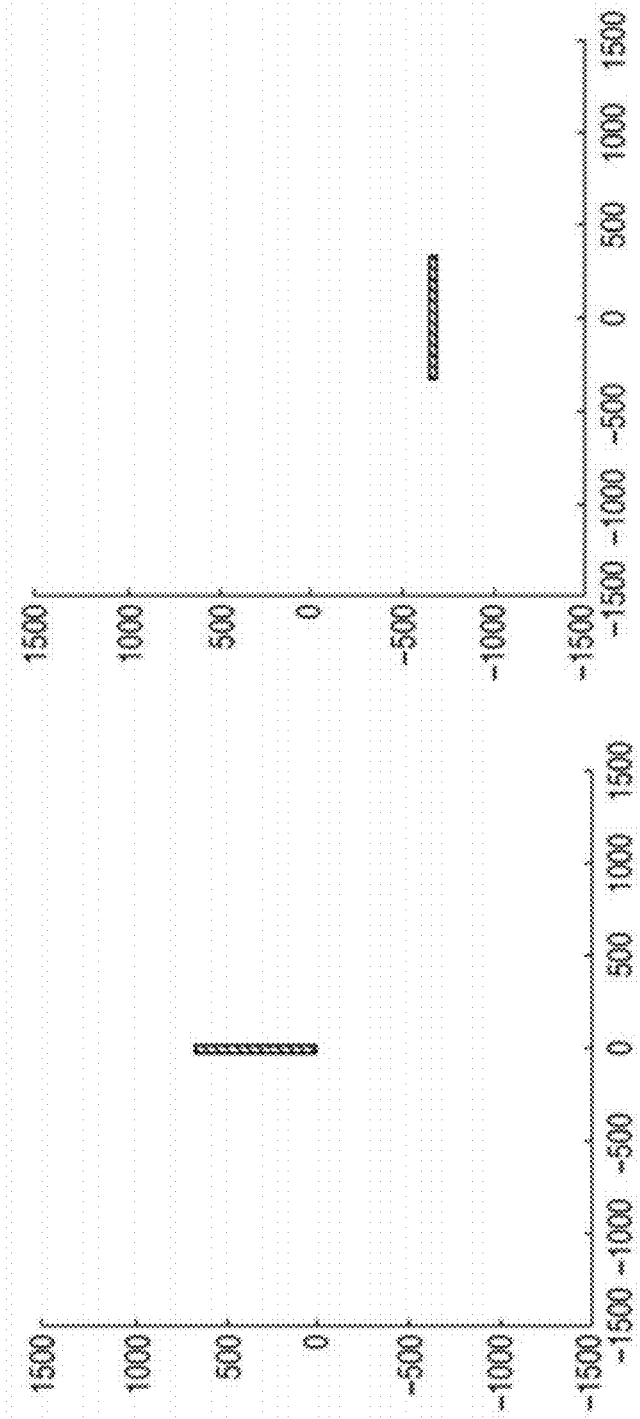

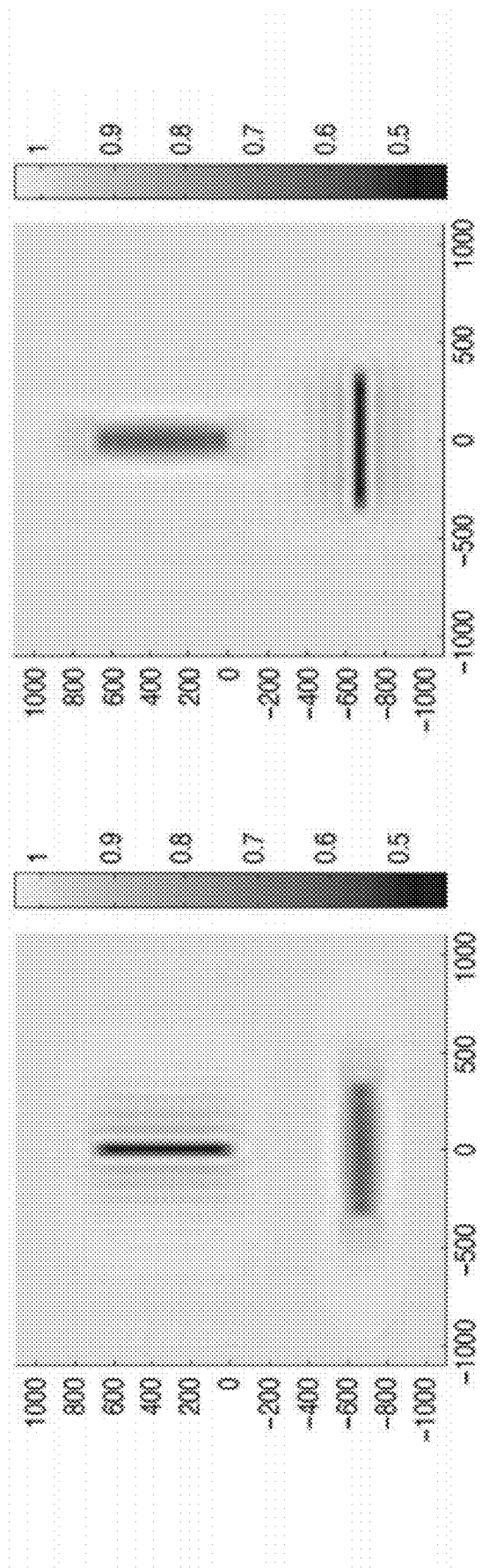

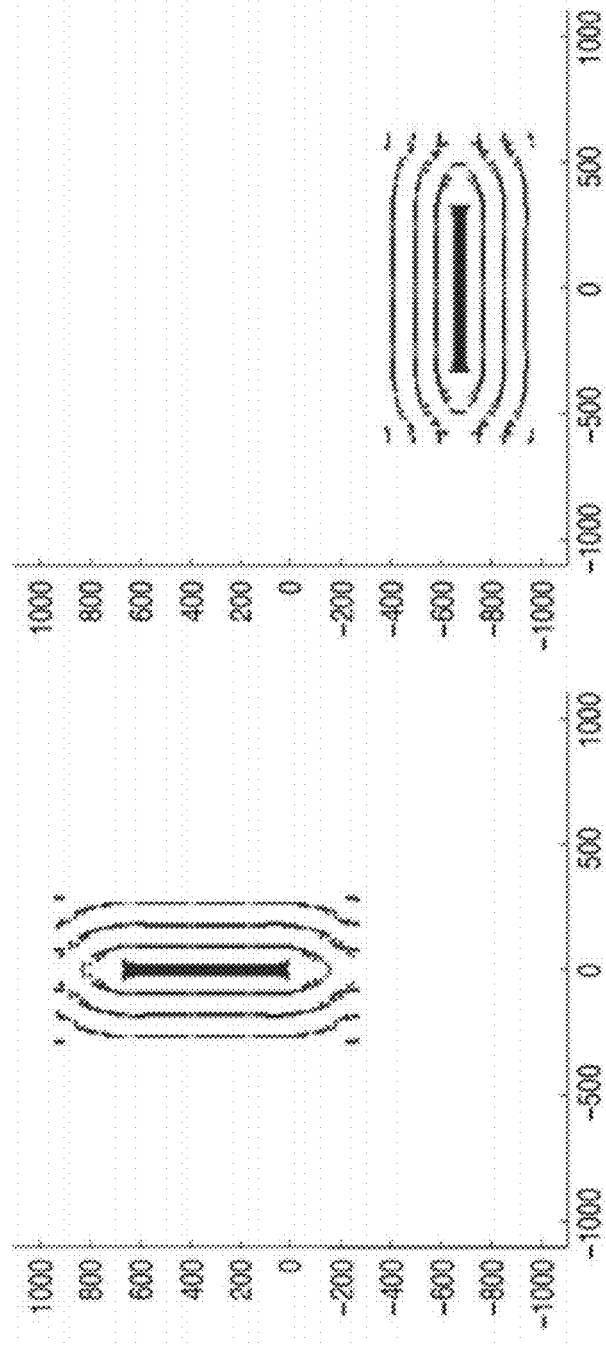

FIG. 16

| | CASE 3 | CASE 4 | CASE 5 |
|---|---|---|---|
| RETICLE PATTERN | | | |
| def=0 | | | |
| def=75(nm) | | | |

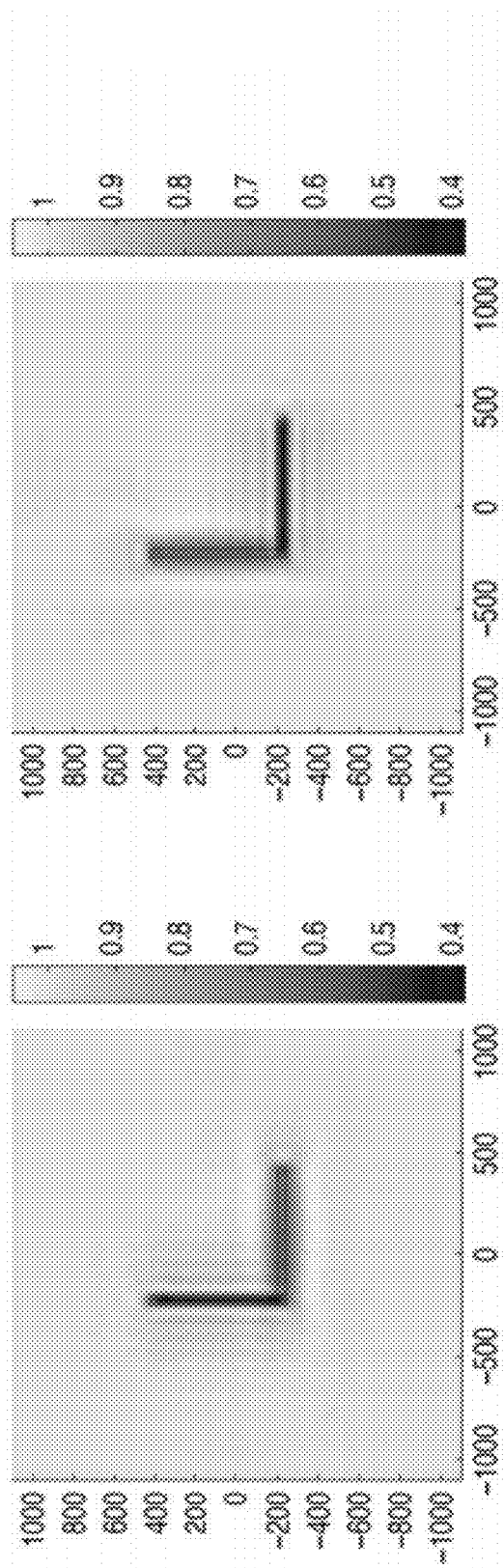

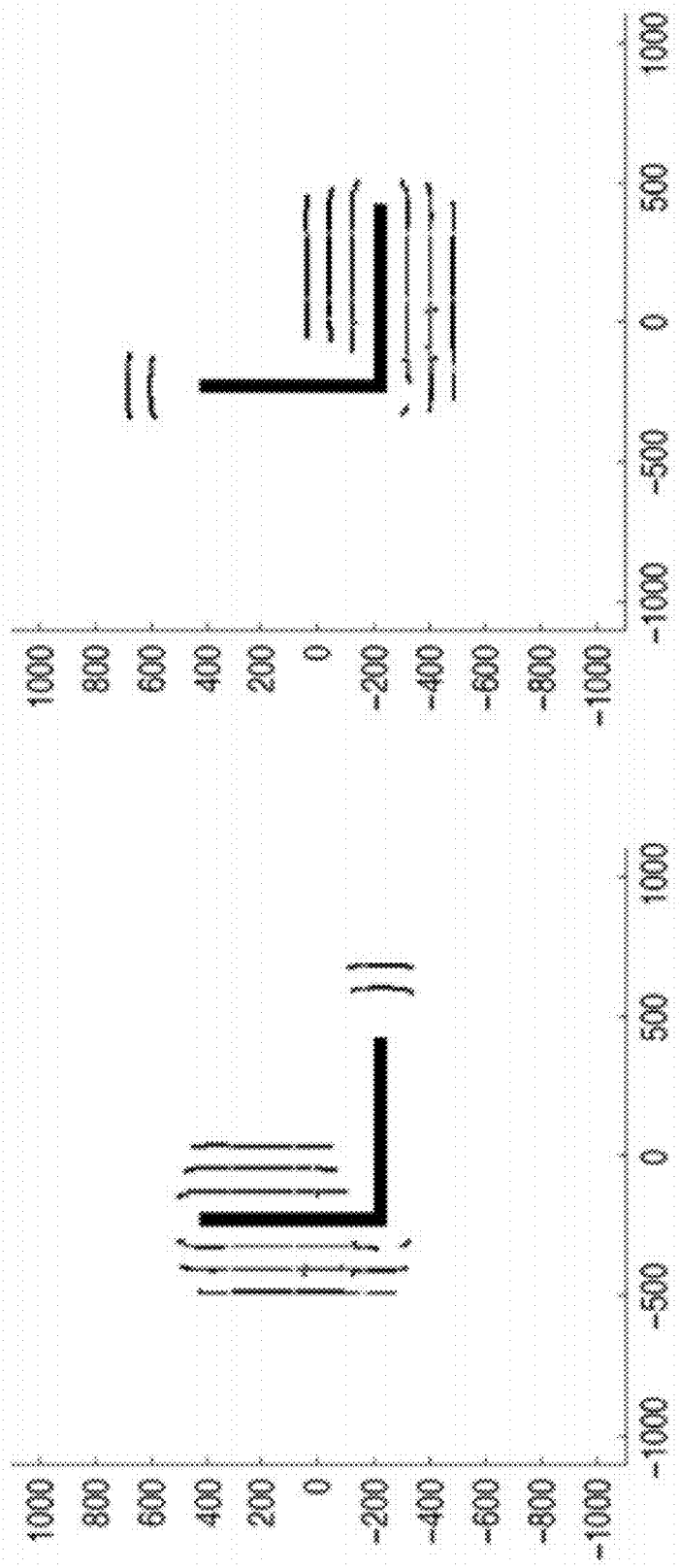

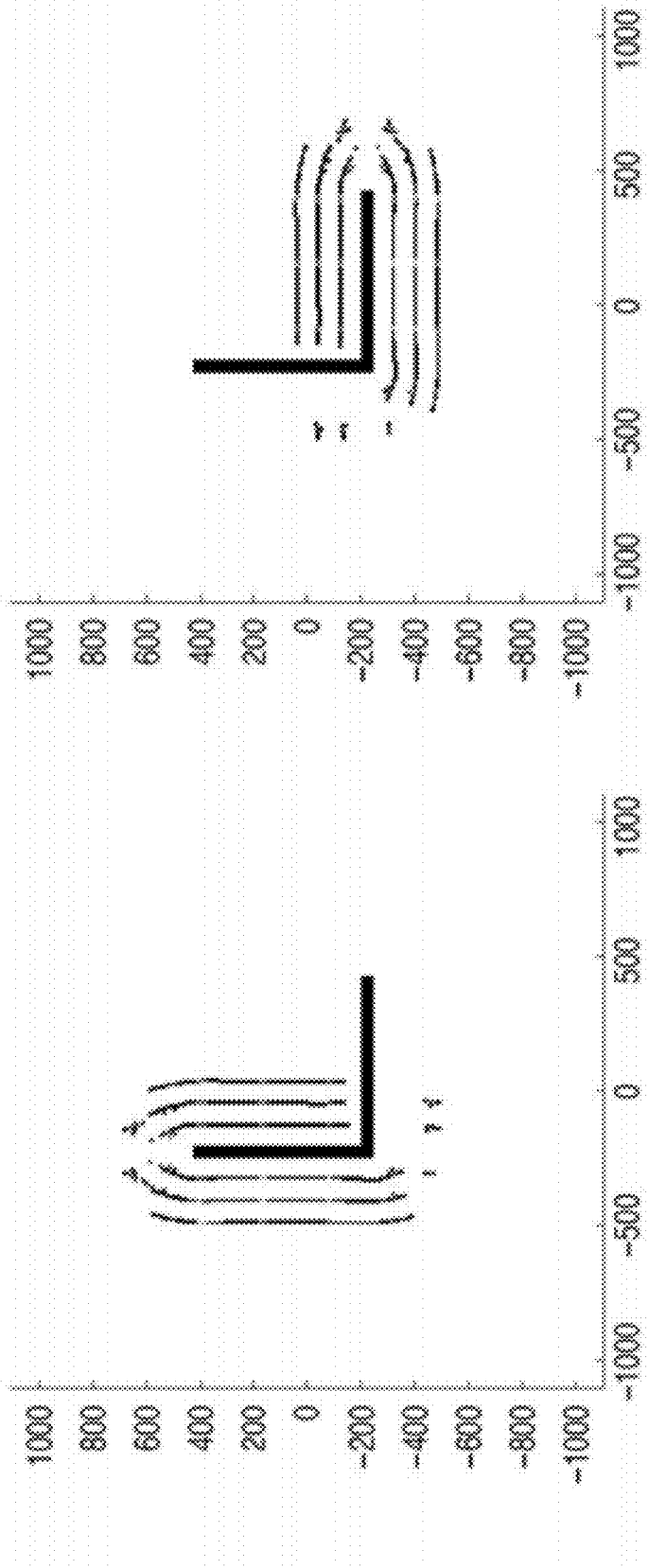

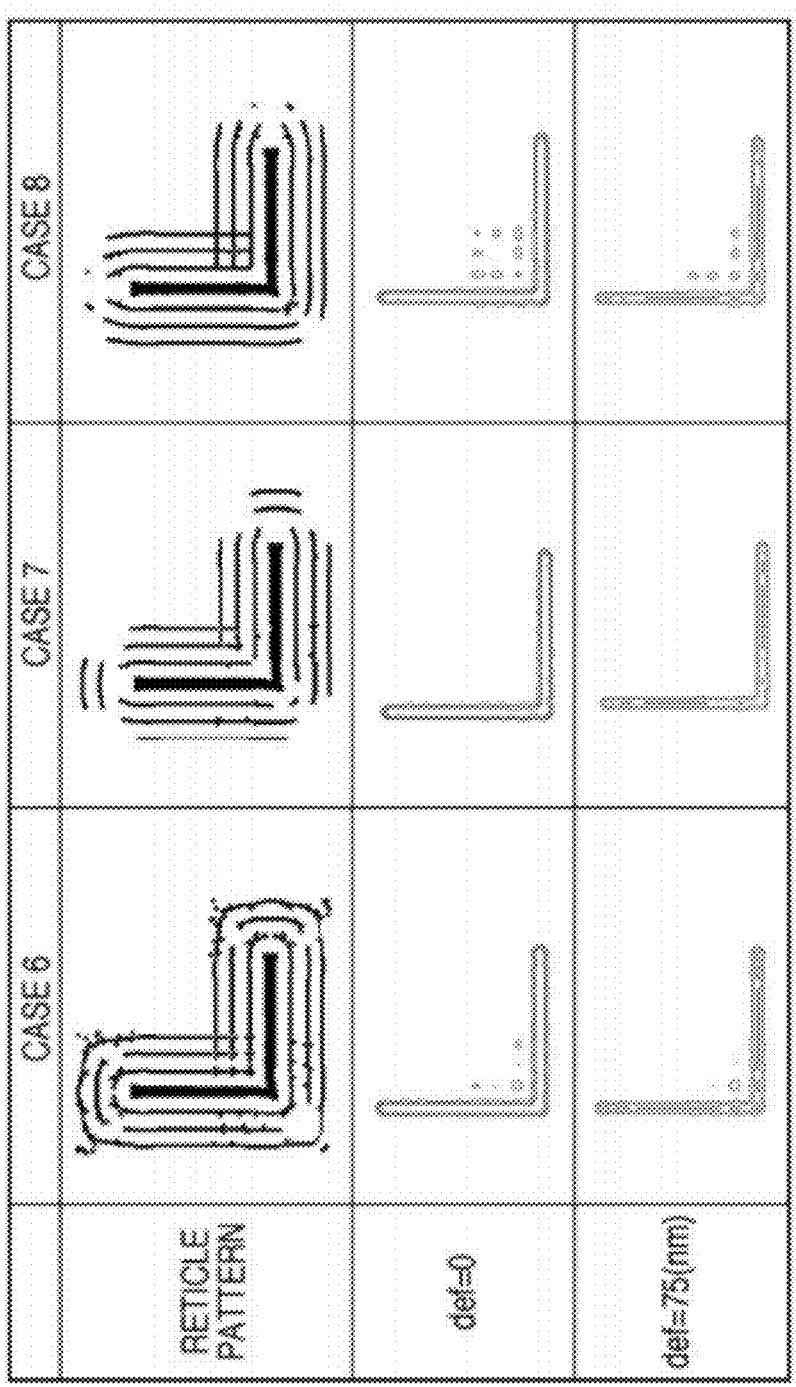

COMPUTER READABLE STORAGE MEDIUM STORING PROGRAM FOR GENERATING RETICLE DATA, AND METHOD OF GENERATING RETICLE DATA

BACKGROUND OF THE INVENTION

1. Field of the Invention

The present invention relates to a computer readable storage medium storing a program for generating reticle data for producing a reticle used in an exposure apparatus, and a method of generating reticle data.

2. Description of the Related Art

A semiconductor device is manufactured by repeating a photolithography process. The photolithography process includes an exposure process of exposing a substrate by illuminating a reticle (also called a mask or original), and projecting the circuit pattern onto a substrate (e.g., a wafer) via a projection optical system. Recent miniaturization of semiconductor devices requires formation of patterns with dimensions smaller than the wavelength of exposure light. However, the formation of such fine patterns is greatly affected by diffraction of light. The contour of a reticle pattern may not be directly formed on a substrate. The pattern may be rounded at the corner or shortened, or the shape accuracy may greatly decrease. To suppress such degradation, the shape of a reticle pattern is corrected. This correction is called optical proximity correction (OPC).

In conventional OPC, the shape of a reticle pattern is corrected by a rule base or a model base using optical simulation, by taking account of the shape of each figure of the reticle pattern and the influence of surrounding patterns.

In the model base using optical simulation, a reticle pattern is deformed until a target pattern is obtained. As the method of deformation, various methods have been proposed. An example is a method (so-called iterative improvement) of, if an optical image is partially expanded, the reticle pattern is narrowed by the any amount, and if the optical image is narrowed, the reticle pattern is expanded by the any amount. While the optical image is recalculated, a formed pattern is gradually deformed to match a target pattern. A method using a genetic algorithm has also been proposed. A method of inserting an auxiliary pattern of a size small enough not to resolve is popular, too.

Japanese Patent Laid-Open No. 2004-221594 discloses a method of determining how to insert an auxiliary pattern by numerical calculation. According to this technique, an interference map is obtained by numerical calculation. A portion where patterns interfere with each other on a reticle and a portion where they cancel each other are derived from the interference map. At a portion where patterns interfere with each other on the interference map, an auxiliary pattern is inserted to make exposure light having passed through the aperture of a main pattern in phase with exposure light having passed through an auxiliary pattern. In the point on the interference map where interference is caused, an auxiliary pattern is inserted so that the phase of exposure light having passed through openings of the contact hole pattern to be transferred and the phase of an exposure light having passed through the auxiliary pattern are equal to each other. At the point on the interference map where interference is canceled, an auxiliary pattern is inserted so that the phase of the exposure light having passed through the openings of the contact hole pattern and the phase of the exposure light having passed through the auxiliary pattern have a difference of 180 degrees. As a result, the contact hole pattern to be transferred and the auxiliary pattern strongly interfere with each other, whereby the target contact hole pattern can be exposed successfully. The interference map amounts light amplitude on the image plane that is positioned in an imaging relation to a reticle plane.

Japanese Patent Laid-Open No. 2008-040470 also discloses a method of numerically obtaining information of an auxiliary pattern. A mask pattern and wafer pattern in a semiconductor exposure apparatus have a partial coherent imaging relationship. In the partial coherent imaging, an aerial image can be calculated by obtaining the coherence on the mask plane from information of an effective light source distribution and performing Fourier integration based on the coherence and the spectral distribution (diffracted light distribution) of a mask. The "coherence" herein mentioned is the degree of interference corresponding to the distance on the mask plane. The "effective light source distribution" is a light intensity distribution formed on the pupil of a projection optical system without any mask.

The coherence of the effective light source can be considered using a transmission cross coefficient (TCC). The TCC is defined by the pupil plane of a projection optical system, and is the portion where the effective light source, the pupil function of the projection optical system, and the complex conjugate of the pupil function of the projection optical system overlap.

According to the method disclosed in Japanese Patent Laid-Open No. 2008-040470, the TCC function is two-dimensionally expressed by fixing the pupil position, thereby obtaining an aerial image. Based on the aerial image, an auxiliary pattern is placed near a peak position expect for a pattern to be resolved.

The interference map in Japanese Patent Laid-Open No. 2004-221594 forms an aerial image when squared, and hence can be regarded as a kind of aerial image.

Circuit patterns can be roughly classified into a line pattern and a contact hole pattern. As patterns are becoming finer and come close to the limit of resolution, it becomes difficult to resolve them.

This is because the contrast is low near the limit of resolution and no desired depth can be attained owing to poor focusing characteristic. As a problem intrinsic to line patterns, the proximity effect is significant and the shape distorts, failing to reproduce an arbitrary shape. Optical proximity correction (OPC) is therefore important for line patterns to correct the shape distortion caused by the proximity effect. In some cases, an auxiliary pattern called SRAF (Sub-Resolution Assist Features) is inserted.

An auxiliary pattern itself is not resolved on the image plane, but interferes with a pattern to be resolved (pattern to be formed on the image plane in accordance with a main pattern), improving the image performance of the pattern to be resolved.

To generate such a reticle pattern, it is easy and effective to insert an auxiliary pattern into a main pattern having undergone optical proximity correction according to the method disclosed in Japanese Patent Laid-Open No. 2004-221594 or 2008-040470.

According to the methods in Japanese Patent Laid-Open Nos. 2004-221594 and 2008-040470, a reticle pattern can be generated based on a given target pattern, illumination conditions (light source shape and polarization), exposure conditions (wavelength, NA, aberration, and magnification), and the like.

However, the illumination conditions are not always optimal for each pattern which forms a reticle pattern. A portion of the pattern that is illuminated under optimal illumination conditions is resolved at high resolution performance. In contrast, a portion of the pattern that is not illuminated under optimal illumination conditions is resolved at only low-resolution performance.

Depending on illumination conditions, the aerial image of an arbitrary line pattern having undergone optical proximity correction has a complicated, wavy shape. If an auxiliary pattern is obtained based on such an aerial image, its shape may become complicated.

Even if a reticle pattern is determined by calculation, no reticle may be produced actually owing to an excessively complicated shape of a fine auxiliary pattern.

SUMMARY OF THE INVENTION

The present invention provides a technique advantageous for forming a pattern more faithful to a target pattern on a substrate.

One of aspects of the present invention provides a computer readable storage medium storing a program for causing a computer to generate reticle data for producing a reticle used in an exposure apparatus in which an illumination optical system illuminates a reticle and a projection optical system projects a pattern of the reticle onto a substrate, the program causing the computer to execute processing including the steps of: classifying target patterns to be formed on a substrate into a plurality of direction groups; extracting, for each of the plurality of direction groups, a region suited to resolution of a target pattern belonging to the direction group from an effective light source distribution formed on a pupil of the projection optical system by the illumination optical system, thereby determining the extracted region as a partial light source; executing, for each of a plurality of partial light sources determined in the step of extracting a region, processing of determining a pattern to be placed on a reticle when each partial light source is used as an illumination condition; and merging patterns determined in the step of executing processing.

Further features of the present invention will become apparent from the following description of exemplary embodiments with reference to the attached drawings.

BRIEF DESCRIPTION OF THE DRAWINGS

FIG. 2B is a flowchart showing reticle data generating processing as another comparative example;

FIG. 3A is a flowchart for explaining reticle data generating processing according to the preferred embodiment of the present invention;

FIGS. 3B-1 and 3B-2 show flowcharts for explaining reticle data generating processing according to the preferred embodiment of the present invention;

FIGS. 3C-1 and 3C-2 show flowcharts for explaining reticle data generating processing according to the preferred embodiment of the present invention;

FIGS. 6A and 6B are views exemplifying target patterns classified into direction groups;

FIGS. 8A and 8B are views exemplifying aerial images formed on the image plane of a projection optical system when deformed main patterns are illuminated with the partial light sources;

FIGS. 9A and 9B are views exemplifying auxiliary patterns obtained based on the deformed main patterns and aerial images;

FIG. 16 is a table exemplifying the two-dimensional images of aerial images calculated based on the reticle pattern of the second embodiment, and the reticle pattern and light source distribution;

FIGS. 21A and 21B are views exemplifying aerial images formed on the image plane of a projection optical system when the deformed main patterns are illuminated with the partial light sources;

FIGS. 22A and 22B are views exemplifying auxiliary patterns obtained based on deformed main patterns and aerial images in the third embodiment;

FIGS. 23A and 23B are views exemplifying auxiliary patterns obtained based on deformed main patterns and aerial images in the fourth embodiment;

FIG. 24 is a table exemplifying the two-dimensional images of aerial images obtained based on the reticle patterns of the third and fourth embodiments, and the reticle pattern and light source distribution;

DESCRIPTION OF THE EMBODIMENTS

Figure 1:
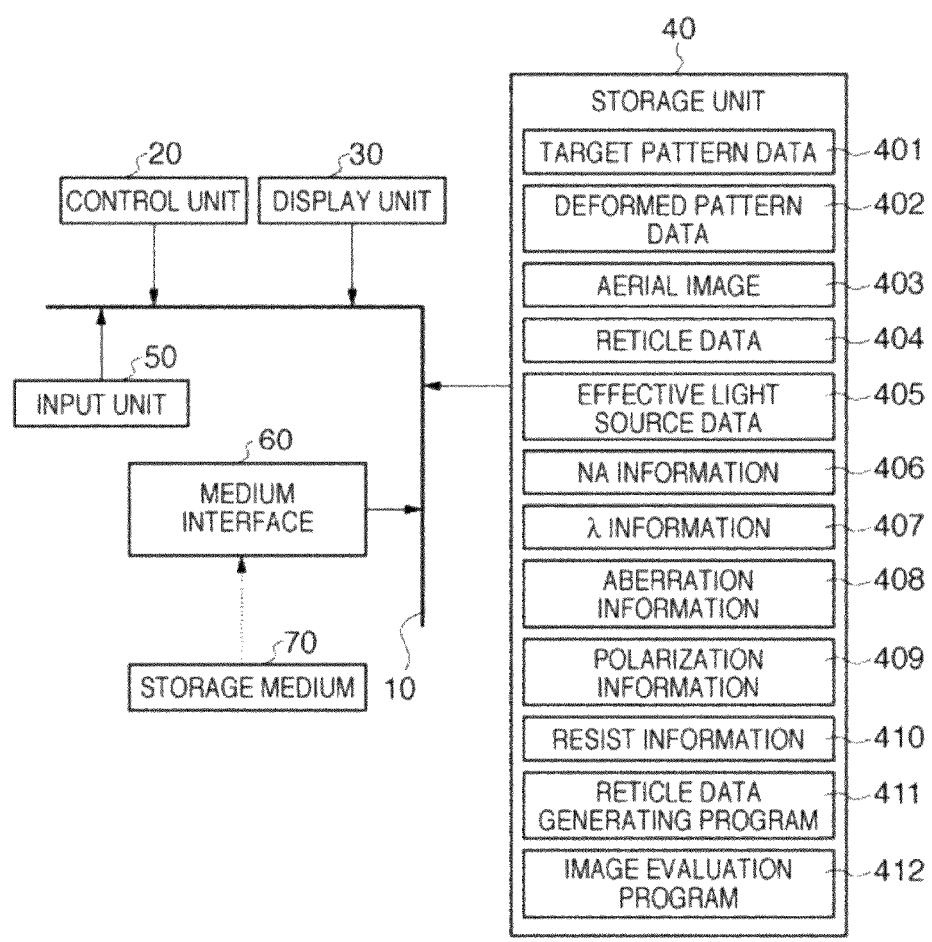
FIG. 1 is a schematic block diagram showing the arrangement of a processing apparatus which executes a reticle data generating method according to a preferred embodiment of the present invention.

The present invention is suited to generate reticle data for producing a reticle used in the manufacture of various devices including semiconductor devices (e.g., an IC, LSI, and CCD), display devices (e.g., a liquid crystal panel), magnetic devices (e.g., a magnetic head), and devices by micromechanics. The micromechanics means a micrometer-order sophisticated mechanical system and a technique of producing it by applying a semiconductor device manufacturing technique to the production of a microstructure. The present invention is useful for, for example, immersion exposure of immersing the final surface of a projection optical system and the surface of a substrate into a liquid and forming a latent pattern on a photosensitive member via the projection optical system and liquid. The present invention is also suitable for a method of reducing the k1 factor.

The concept disclosed in this specification can be modeled mathematically. Hence, the present invention can be implemented as a software function of a computer system. The software function of the computer system includes programming having executable codes, and can determine a reticle pattern and generate reticle data. A general-purpose computer can execute the software codes. During execution of the software codes, codes or related data records are stored in the platform of the general-purpose computer. In other cases, the software is stored in another site or loaded into an appropriate general-purpose computer system. At least one computer readable storage medium can hold the software codes as one or a plurality of modules. The present invention to be described below is described in the form of codes mentioned above, which can function as one or a plurality of software products. The processor of the computer system executes the software codes.

A preferred embodiment of the present invention will be described below with reference to the accompanying drawings. The same reference numerals denote the same parts throughout the drawings, and a repetitive description thereof will be omitted.

FIG. 1 is a schematic block diagram showing the arrangement of a processing apparatus (computer) 1 which executes a reticle data generating method according to the embodiment of the present invention. The processing apparatus 1 is formed from, for example, a general-purpose computer, and includes a bus line 10, control unit 20, display unit 30, storage unit 40, input unit 50, and medium interface 60, as shown in FIG. 1.

The bus line 10 interconnects the control unit 20, display unit 30, storage unit 40, input unit 50, and medium interface 60. The control unit 20 is formed from a CPU, GPU, DSP, or microcomputer, and includes a cash memory for primary storage. In response to an instruction input by the user via the input unit 50 to start up a reticle data generating program 411, the control unit 20 executes the reticle data generating program 411 stored in the storage unit 40.

The display unit 30 can include, for example, a display device such as a liquid crystal display. The display unit 30 displays, e.g., information associated with execution of the reticle data generating program 411 (e.g., an aerial image 403, reticle data 404, and effective light source data 405).

The storage unit or memory medium 40 can include, for example, a semiconductor memory and hard disk. The storage unit 40 stores the reticle data generating program 411 and an image evaluation program 412 which are provided from a storage medium 70 connected to the medium interface 60.

The storage unit 40 can further store target pattern data 401, deformed pattern data 402, the aerial image 403, the reticle data 404, the effective light source data 405, NA information 406, λ information 407, aberration information 408, polarization information 409, and resist information 410.

The target pattern data 401 is data of a pattern (also called a layout pattern or target pattern) laid out in designing an integrated circuit or the like. The target pattern data 401 is input information for determining a reticle pattern.

The deformed pattern data 402 is data containing a main pattern obtained by deforming a target pattern so as to form the target pattern. The deformed pattern data 402 can contain an auxiliary pattern. The deformed pattern data 402 is generated by executing the reticle data generating program 411. The main pattern may be a target pattern itself, but is typically a pattern generated by executing the reticle data generating program 411, that is, a deformed target pattern. The difference between the main pattern and the auxiliary pattern resides in whether the pattern is resolved. A pattern to be resolved is called a main pattern, and one not to be resolved is called an auxiliary pattern.

The reticle data 404 is data for drawing a pattern such as a Cr pattern on a reticle plate. The reticle data 404 is final pattern data determined through image evaluation by the image evaluation program 412 after executing the reticle data generating program 411. The reticle data 404 contains data of a deformed main pattern and inserted auxiliary pattern.

Note that the target pattern data 401, deformed pattern data 402, and reticle data 404 can contain the positions, sizes, shapes, transmittances, and phase information of main and auxiliary patterns. The target pattern data 401, deformed pattern data 402, and reticle data 404 also contain the transmittance and phase information of a region (background) where neither the main pattern nor auxiliary pattern exists.

As will be described later, the aerial image 403 is an aerial image (three-dimensional light intensity distribution) formed by interference of light on the surface of a substrate. The effective light source data 405 is associated with a light intensity distribution formed on the pupil plane of the projection optical system of the exposure apparatus. The NA information 406 is associated with the image-side numerical aperture (NA) of the exposure apparatus. The λ information 407 is associated with the wavelength λ of exposure light of the exposure apparatus. The aberration information 408 is associated with aberration of the projection optical system of the exposure apparatus. When the projection optical system of the exposure apparatus has birefringence, a phase shift occurs in accordance with the birefringence. This phase shift can be regarded as a kind of aberration. The polarization information 409 is associated with the polarization state of illumination light emitted by the illumination device of the exposure apparatus. The resist information 410 is associated with a resist applied to a substrate.

The reticle data generating program 411 is used to generate the reticle data 404 based on the supplied target pattern data 401 by causing the processing apparatus (computer) 1 to execute the reticle data generating method. The image evaluation program 412 is used to evaluate the image performance of the calculated aerial image 403. The image evaluation program 412 evaluates image performance such as the line width (CD) and contrast.

The input unit 50 includes, for example, a keyboard and mouse. The user can input information via the input unit 50 for the reticle data generating program 411. The medium interface 60 includes, for example, a floppy disk drive, CD-ROM drive, and USB interface, and is connectable to the storage medium 70. The storage medium 70 includes, for example, a floppy disk, CD-ROM, and USB memory, and can be used to provide the processing apparatus 1 with the reticle data generating program 411, the image evaluation program 412, and other programs to be executed by the processing apparatus 1.

Figure 2A:
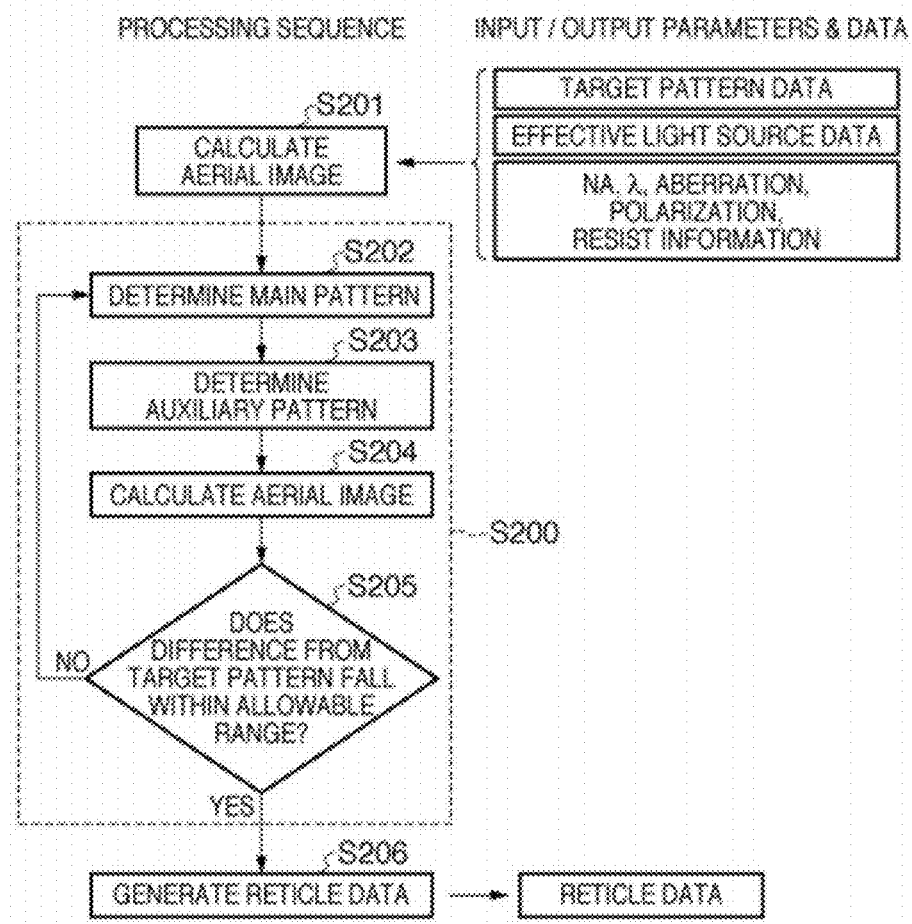
FIG. 2A is a flowchart showing reticle data generating processing as a comparative example.

FIG. 2A is a flowchart showing reticle data generating processing as a comparative example. In FIG. 2A, a left arrow indicates input of parameters, and a right arrow indicates output of data (reticle data).

In step S201, an aerial image to be formed on the image plane of the projection optical system is calculated based on input information. The input information can contain, for example, the target pattern data 401, effective light source data 405, NA information 406, λ information 407, aberration information 408, polarization information 409, and resist information 410.

In step S200, the main and auxiliary patterns of a reticle are determined. Step S200 includes steps S202 to S205. In step S202, a main pattern is determined based on the aerial image to come close to a target pattern represented by target pattern data. Data of the main pattern is set as deformed pattern data. When step S202 is executed for the second time or later, the main pattern is deformed so that the main pattern represented by the determined deformed pattern data comes close to the target pattern shape.

In step S203, the peak position of the light intensity in a region which does not overlap the main pattern in the aerial image is obtained and determined as the position of the auxiliary pattern. In step S203, the shape of the auxiliary pattern can be determined based on the light intensity in the aerial image. The determined position and shape of the auxiliary pattern are added to the deformed pattern data.

In step S204, an aerial image formed by the main and auxiliary patterns represented by the current deformed pattern data is calculated. In step S205, the target pattern and the aerial image calculated in step S204 are compared to determine whether the difference between them falls within an allowable range. If the difference falls within the allowable range, the process advances to step S5206; if it does not, returns to step S202. In step S202, the main pattern is deformed again. In step S206, reticle data is generated based on the deformed pattern data.

When the auxiliary pattern is determined using the aerial image, its position is determined uniquely with respect to the main pattern. However, the placed auxiliary pattern affects an image formed by the main pattern, and thus a main pattern determined for the first time may lead to excessive correction. To prevent this, the process sometimes returns to step S202. However, the repeat count in step S200 suffices to be one or two in general.

FIG. 2B is a flowchart showing reticle data generating processing as another comparative example. The reticle data generating processing shown in FIG. 2B is a modification of the reticle data generating processing shown in FIG. 2A. The position of an auxiliary pattern is determined uniquely with respect to a main pattern. It is therefore possible to deform a main pattern at high precision in step S200' and then determine an auxiliary pattern in step S203, as shown in FIG. 2B. In this example, step S200' includes steps S202, S204, and S205.

Reticle data generating processing according to the embodiment of the present invention will be explained with reference to FIGS. 3A, 3B-1, 3B-2, 3C-1, and 3C-2. The reticle data generating processing is processing of generating reticle data for producing a reticle used in an exposure apparatus in which the illumination optical system illuminates a reticle and the projection optical system projects the reticle pattern onto a substrate. In FIGS. 3A, 3B-1, 3B-2, 3C-1, and 3C-2, a left arrow indicates input of parameters, and a right arrow indicates output of data. In FIGS. 3A, 3B-1, 3B-2, 3C-1, and 3C-2, an arrow from "pattern 01 of direction 1" to "partial light source 1" means that a partial light source suited to "pattern 01 of direction 1" is "partial light source 1". This also applies to other down arrows, and these arrows indicate partial light sources suited to patterns of given directions.

Reticle data generating processing shown in FIG. 3A will be explained. The control unit 20 executes the reticle data generating processing based on the reticle data generating program 411. In the reticle data generating processing shown in FIG. 3A, target patterns are classified into a plurality of direction groups in accordance with the longitudinal directions of the target patterns. For each direction group, main and auxiliary patterns are determined using a partial light source corresponding to the direction as an illumination condition.

After that, the main and auxiliary patterns of a plurality of groups are merged to obtain a reticle pattern. One partial light source means one or a plurality of parts of an effective light source. For example, one partial light source can be a dipole illumination when the effective light source is a quadrupole one.

In step S301 (classification step), target patterns represented by target pattern data are classified into a plurality of direction groups in accordance with the longitudinal directions of the target patterns. The direction groups are a group formed from pattern 01 of direction 1, a group formed from pattern 02 of direction 2, ..., a group formed from pattern 0n of direction n.

In step S302 (partial light source determination step), a partial light source suited to the resolution of a target pattern belonging to each direction group is determined. For example, partial light source 1 is determined in conformity with the group formed from pattern 01 of direction 1. Partial light source 2 is determined in conformity with the group formed from pattern 02 of direction 2. Partial light source n is determined in conformity with the group formed from pattern 0n of direction n. Partial light sources 1 to n may be partially common to each other.

Figure 25:
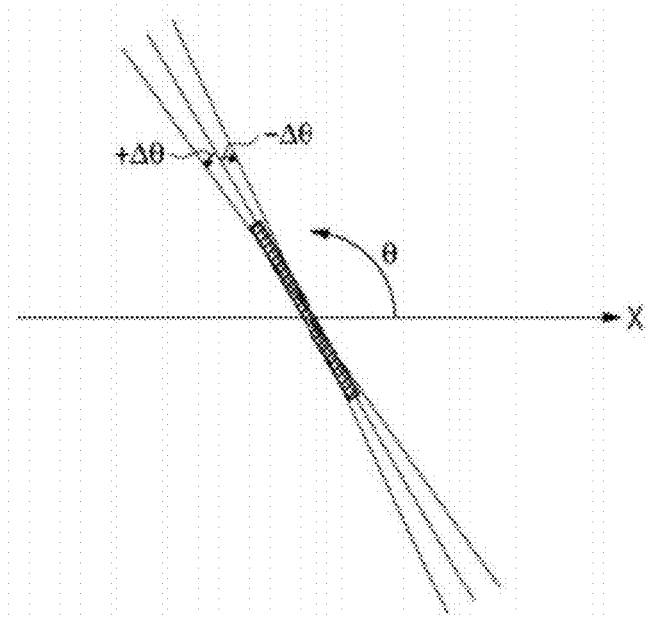
FIG. 25 is a view showing the definition of the pattern direction.

FIG. 25 is a view exemplifying the definition of the direction group. The longitudinal direction of a pattern (to be more simply referred to as a "pattern direction") can be defined as an angle θ ($0 \leq \theta < \pi$) with respect to the x-axis in the x-y coordinate system defined on a reticle. One direction group is formed from patterns having longitudinal directions falling within an angle range of $\theta \pm \Delta\theta$.

More specifically, a direction group to which patterns having longitudinal directions falling within the angle range of $\pm\Delta\theta$ with respect to $\theta = 2(j-1)\Delta\theta$ belong can be defined as the direction group of direction j. Note that $j=1, \ldots, \pi/(2\Delta\theta)$.

Figure 26A:
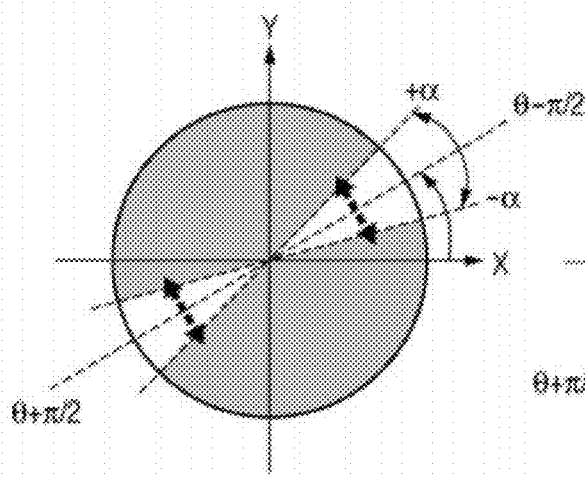
FIGS. 26A and 26B are views exemplifying partial light sources corresponding to patterns in a given direction.
Figure 26B:
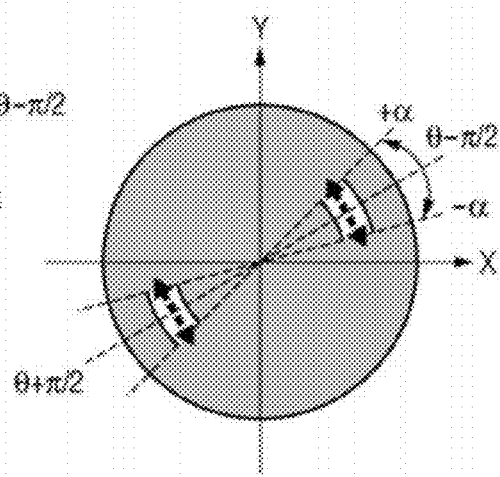

FIGS. 26A and 26B are views exemplifying partial light sources. For example, a dipole illumination in FIG. 26A is suitable for the resolution of a line pattern in a specific direction. That is, a partial light source suited to a pattern whose longitudinal direction falls within the angle range of $\theta \pm \Delta\theta$ has a region with an angle of $\theta \pm \pi/2$ between the center line (axis of symmetry) and the x-axis and a divergence angle of $\pm\alpha$ with respect to the center line. Note that α need not be equal to Δθ and can be arbitrarily set up to a maximum angle of 90°.

Letting HP be the minimum half pitch in the array of target patterns, λ be the wavelength of exposure light, and NA be the numerical aperture of the projection optical system of the exposure apparatus, k1=HP/(λ/NA). This equation reveals that a partial light source obtained by setting the center of the dipole illumination to 1/(4k1) to narrow the width as shown in FIG. 26B is preferably set as a partial light source suited to the resolution of a portion having the minimum half pitch.

A region suited to the resolution of a target pattern is extracted from a region where the light intensity in the effective light source distribution has a predetermined value or more. The extracted region is determined as the partial light source. If no appropriate region can be extracted as a partial light source from the effective light source distribution, the effective light source (illumination condition) needs to be changed. Alternatively, the light source may be optimized for only the pattern of a given direction group to determine, as a partial light source, a portion where the optimum light source overlaps the effective light source distribution.

The partial light source is preferably determined in consideration of an optimum polarization direction as indicated by the direction of an arrow in FIG. 26A or 26B. The polarization direction of the partial light source complies with the illumination condition which determines the effective light source.

If the polarization direction of the partial light source is not proper, the illumination condition needs to be changed.

In step S303, one of partial light sources determined in step S302 is set as the condition of subsequent calculation.

In step S304, an aerial image formed on the image plane of the projection optical system is calculated based on the target pattern data 401, NA information 406, λ information 407, aberration information 408, polarization information 409, and resist information 410. The calculation of the aerial image is executed using the partial light source set in step S303 as an illumination condition. In step S304, aerial images may be calculated for all target patterns represented by the target pattern data 401, or the aerial image of only a target pattern suited to the partial light source set in step S303 may be calculated. In the latter case, when partial light source 1 is set as an illumination condition, the aerial image of only a target pattern belonging to the group of direction 1 suited to partial light source 1 is calculated. When the aerial images of all target patterns are calculated, the proximity effect between the target patterns is considered. If the proximity effect between target patterns need not be considered (e.g., when the distance between target patterns is large or only patterns in the same direction are transferred by one exposure in a multiple exposure process), the aerial image of only the pattern of direction j suited to the partial light source suffices to be calculated.

After step S304, the same processing as step S200 (S202 to S205) in FIG. 2A can be executed. In the processing shown in FIG. 2A, calculation is done for all target patterns using, as an illumination condition, an effective light source represented by the effective light source data 405. To the contrary, in the processing shown in FIG. 3A, the partial light source set in step S303 is used as an illumination condition, and calculation is performed for only target patterns belonging to a group suited to the partial light source.

In step S202, a main pattern (e.g., main pattern 11) is determined or deformed based on the aerial image for a target pattern (e.g., pattern 01) belonging to a direction group suited to the partial light source (e.g., partial light source 1) set in step S303. Data of the determined or deformed main pattern serves as deformed pattern data. The processing to determine and deform a main pattern can include optical proximity correction. When two or more main patterns overlap each other, they may be merged into a new main pattern.

In step S203, an auxiliary pattern (e.g., auxiliary pattern 21) which interferes with the main pattern (e.g., main pattern 11) is determined. For example, peak positions in the aerial image are obtained, and a peak position which can be employed as an auxiliary pattern position is extracted from them. At this position, an auxiliary pattern having a line width small enough not to resolve can be placed.

It is also possible to impose an angle limitation on an auxiliary pattern as well and determine whether a peak position can be employed as an auxiliary pattern position. More specifically, a deviation from the target pattern direction is permitted within a given range, and auxiliary patterns extending in other directions are excluded. The angle limitation can be imposed to remove noise and simplify the shape of an auxiliary pattern which tends to become complicated.

The determination of the auxiliary pattern will be explained in more detail. First, peak positions in the aerial image are obtained. Then, the peak positions are sequentially set as a peak position of interest. The peak position of interest and a peak position closest to it are linked by a line to obtain the angle between the line and the x-axis. For a partial light source having an angle of $\theta \pm \pi/2$ between the center line (axis of symmetry) and the x-axis, only a peak position for which the direction of the line liking peak positions falls within the angle range of $\theta \pm \Delta\theta'$ is determined as an auxiliary pattern position.

Figure 27A:
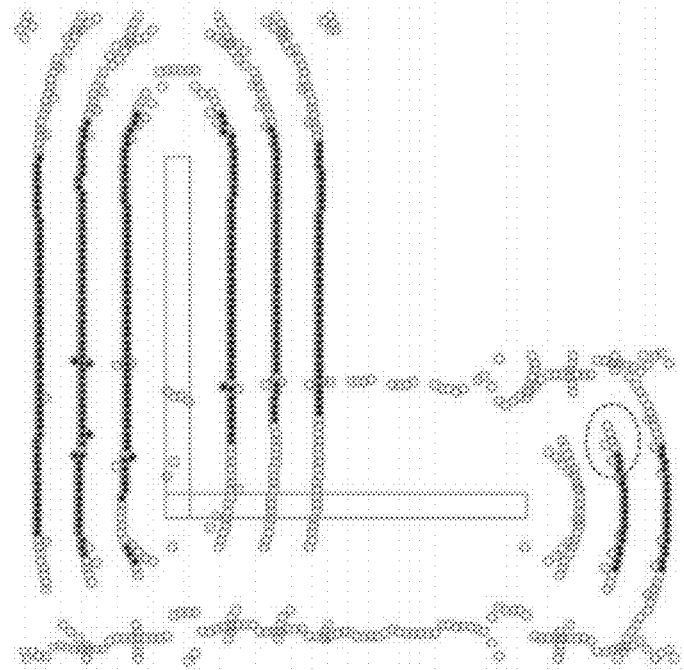
FIGS. 27A and 27B are views exemplifying extracted peak positions, and positions selected as auxiliary pattern positions.

FIG. 27A exemplifies extracted peak positions and peak positions selected as auxiliary pattern positions. In FIG. 27A, ○ represents an extracted peak position, and ● represents a peak position satisfying the angle limitation (i.e., a peak position selected as an auxiliary pattern position). A portion circled by a dotted line in FIG. 27A is enlarged and shown in FIG. 27B.

Figure 27B:
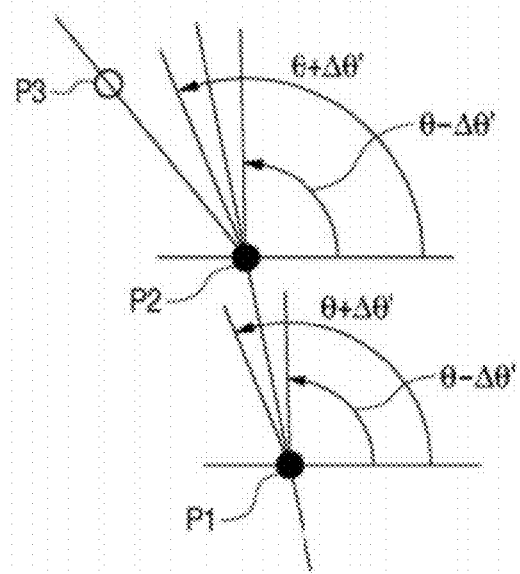

When attention is paid to a peak position P1 in FIG. 27B, a peak position closest to the peak position P1 of interest is P2. The angle of a line linking P1 and P2 with respect to the x-axis falls within the angle range of $\theta - \Delta\theta'$ to $\theta + \Delta\theta'$, so P2 is selected as an auxiliary pattern position. When attention is paid to the peak position P2, a peak position closest to the peak position P2 of interest is P3. The angle of a line linking P2 and P3 with respect to the x-axis does not fall within the angle range of $\theta \pm \Delta\theta'$, so P3 is not selected as an auxiliary pattern position. Note that $\Delta\theta'$ need not be the same value as $\Delta\theta$ and can be arbitrarily set within the range of $0 < \Delta\theta' \leq \pi/2$. $\Delta\theta$, $\Delta\theta'$, and $\alpha$ can be set arbitrarily.

Finally, a pattern having a line width small enough not to resolve at the determined auxiliary pattern position is set as an auxiliary pattern. When two or more auxiliary patterns overlap each other, they may be merged into a new auxiliary pattern.

In step S204, an aerial image formed by the main and auxiliary patterns represented by the current deformed pattern data is calculated using the partial light source set in step S303 as an illumination condition.

In step S205, the target pattern and the aerial image calculated in step S204 are compared to determine whether the difference between them falls within an allowable range. If the difference falls within the allowable range, the process advances to step S206; if it does not, it returns to step S202. In step S202, the main pattern is deformed again.

In step S305, it is determined whether the processes in steps S303, S304, and S200 (S202 to S205) have been done for all the partial light sources determined in step S302. If these processes have been done for all the partial light sources, the process advances to step S306. If these processes have not been done for all the partial light sources, the process returns to step S303 to set an unprocessed partial light source.

In the reticle data generating processing shown in FIG. 3A, steps S303, S304, S200, and S305 form a pattern determination step.

In step S306, main patterns (main patterns 11 to 1n) and auxiliary patterns (auxiliary patterns 21 to 2n) are merged to generate a reticle pattern. In step S307, reticle data is generated based on the reticle pattern. The reticle pattern and reticle data mentioned here are logically equivalent information except for the format.

Reticle data generating processing shown in FIGS. 3B-1 and 3B-2 will be explained. The control unit 20 executes the reticle data generating processing based on the reticle data generating program 411. In the reticle data generating processing shown in FIGS. 3B-1 and 3B-2, main patterns are determined based on all target patterns using the effective light source distribution as an illumination condition. An auxiliary pattern is then determined using each partial light source as an illumination condition.

In step S301 (classification step), target patterns represented by target pattern data are classified into a plurality of direction groups in accordance with the longitudinal directions of the target patterns. The direction groups are a group formed from pattern 01 of direction 1, a group formed from pattern 02 of direction 2, ..., a group formed from pattern 0n of direction n.

In step S302 (partial light source determination step), a partial light source suited to each direction group is determined. For example, partial light source 1 is determined in conformity with a group formed from pattern 01 of direction 1. Partial light source 2 is determined in conformity with a group formed from pattern 02 of direction 2. Partial light source n is determined in conformity with a group formed from pattern 0n of direction n. Partial light sources 1 to n may be partially common to each other.

In step S310, an aerial image formed on the image plane of the projection optical system is calculated based on the target pattern data 401, effective light source data 405, NA information 406, λ information 407, aberration information 408, polarization information 409, and resist information 410. The calculation of the aerial image is executed based on not a partial light source but an effective light source represented by the effective light source data 405. In step S310, aerial images are calculated for all target patterns represented by the target pattern data 401. After step S310, the same processing as step S200' (S202, S204, and S205) in FIG. 2B is executed to determine a main pattern. In the reticle data generating processing shown in FIGS. 3B-1 and 3B-2, steps S310 and S200' form a main pattern determination step.

In step S311, one of partial light sources determined in step S302 is set as the condition of subsequent calculation. In step S312, the aerial image of the main pattern is calculated using, as an illumination condition, the partial light source set in step S311.

In step S313, an auxiliary pattern which interferes with the main pattern is determined using, as an illumination condition, the partial light source set in step S311. For example, peak positions in the aerial image are obtained, and a peak position which can be employed as an auxiliary pattern position is extracted from them. An auxiliary pattern having a line width small enough not to resolve at this position can be determined. For example, when partial light source 1 is set, auxiliary pattern 21 is determined. When partial light source 2 is set, auxiliary pattern 22 is determined. When partial light source n is set, auxiliary pattern 2n is determined.

In step S315, it is determined whether the processes in steps S312 and S313 have been done for all the partial light sources determined in step S302. If these processes have been done for all the partial light sources, the process advances to step S306. If these processes have not been done for all the partial light sources, the process returns to step S311 to set an unprocessed partial light source.

Figures 1, 3B:
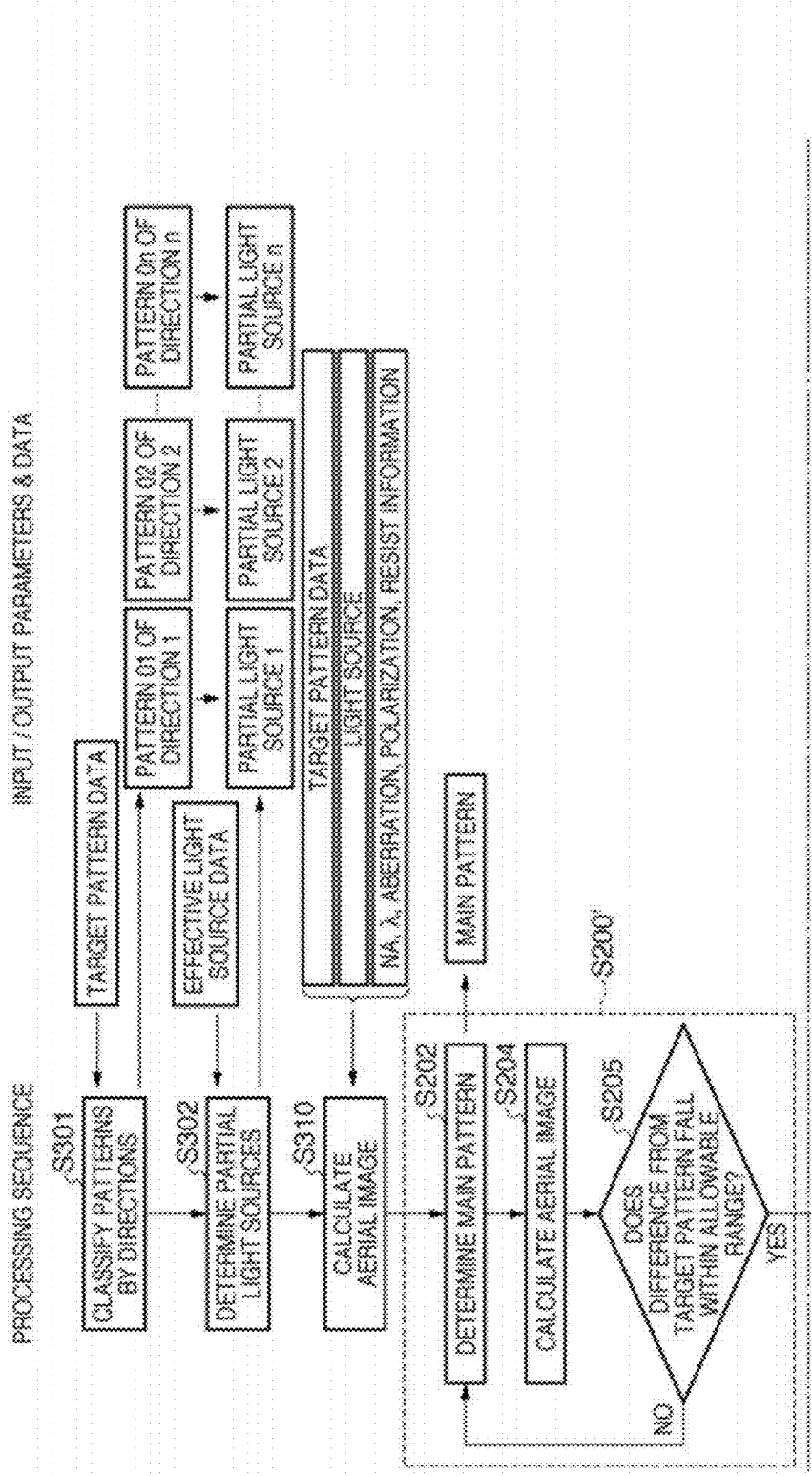
Figures 2, 3C:
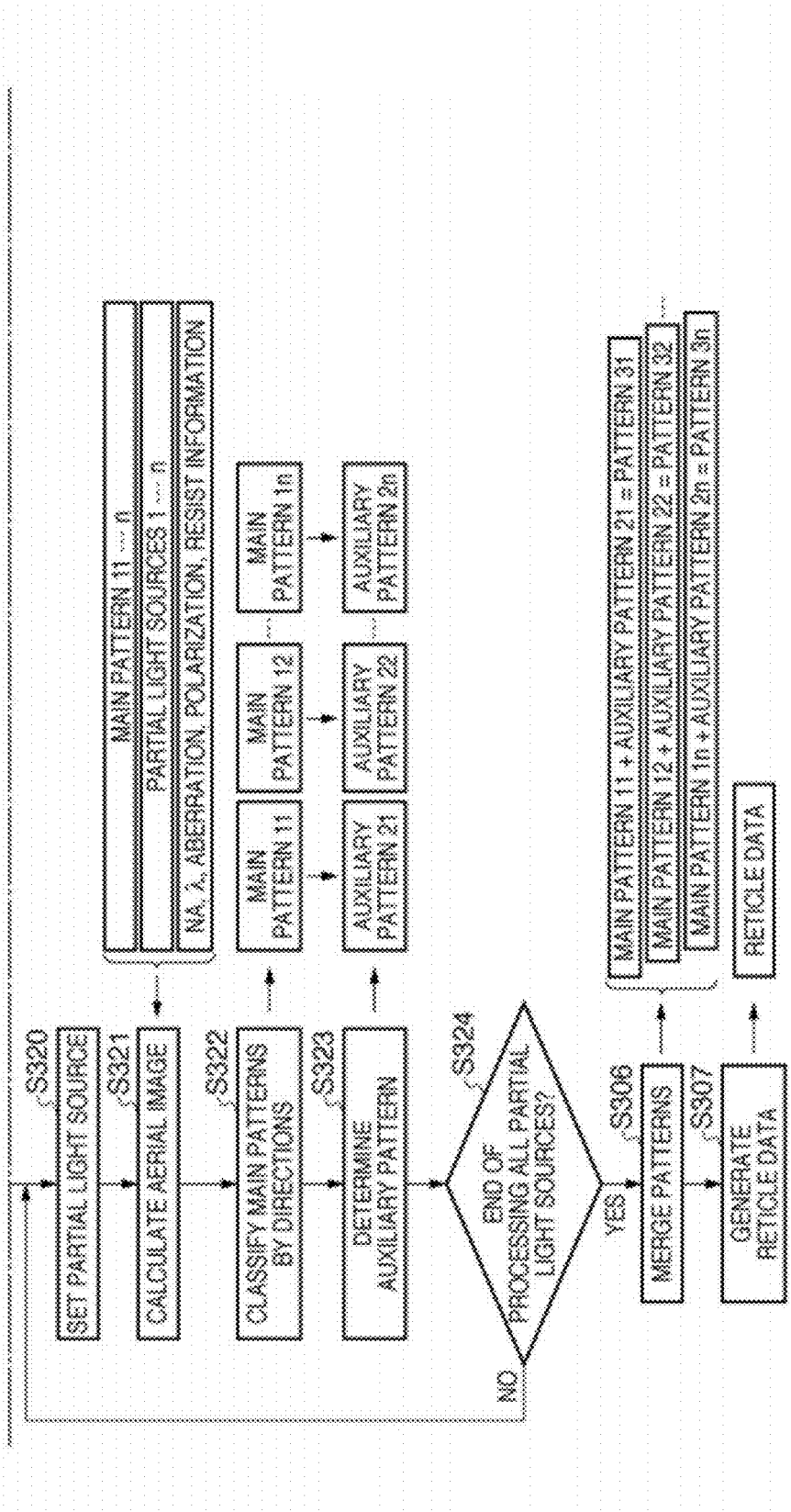

In the reticle data generating processing shown in FIGS. 3B-1 and 3B-2, steps S311 to S315 form a pattern determination step (also regarded as an auxiliary pattern determination step).

In step S306, main patterns and auxiliary patterns (auxiliary patterns 21 to 2n) are merged to generate a reticle pattern. In step S307, reticle data is generated based on the reticle pattern. The reticle pattern and reticle data mentioned here are equivalent information except for the format.

Reticle data generating processing shown in FIGS. 3C-1 and 3C-2 will be explained. The control unit 20 executes the reticle data generating processing based on the reticle data generating program 411. In the reticle data generating processing shown in FIGS. 3C-1 and 3C-2, main patterns are determined by deforming all target patterns using the effective light source as an illumination condition. Thereafter, an auxiliary pattern is determined using each partial light source as an illumination condition. In the determination of an auxiliary pattern, an auxiliary pattern is placed in only the peripheral region of main pattern 1j suited to partial light source j. The region where an auxiliary pattern is placed can be defined in advance.

Processes in steps S301 to S200' are the same as those in the reticle data generating processing shown in FIGS. 3B-1 and 3B-2. In the reticle data generating processing shown in FIGS. 3C-1 and 3C-2, steps S310 and S200' form a main pattern determination step.

In step S320, one of partial light sources determined in step S302 is set as the condition of subsequent calculation. In step S321, the aerial image of the main pattern is calculated using, as an illumination condition, the partial light source set in step S320. For example, when partial light source 1 is set in step S320, aerial image 1 is calculated using partial light source 1 as an illumination condition. Similarly, when partial light source 2 is set in step S320, aerial image 2 is calculated using partial light source 2 as an illumination condition. When partial light source n is set in step S320, aerial image n is calculated using partial light source n as an illumination condition.

In step S322, main patterns are classified into a plurality of direction groups in accordance with their longitudinal directions. The direction groups are a group formed from main pattern 11 of direction 1, a group formed from main pattern 12 of direction 2, ..., a group formed from main pattern 0n of direction n.

In step S323, an auxiliary pattern which interferes with the main pattern is determined based on the aerial image calculated in step S321. Based on aerial image 1 calculated in step S321 using partial light source 1 as an illumination condition, auxiliary pattern 21 is placed in only the peripheral region of main pattern 11 having a direction suited to partial light source 1. Based on aerial image 2 calculated in step S321 using partial light source 2 as an illumination condition, auxiliary pattern 22 is placed in only the peripheral region of main pattern 12 having a direction suited to partial light source 2. Based on aerial image n calculated in step S321 using partial light source n as an illumination condition, auxiliary pattern 2n is placed in only the peripheral region of main pattern 1n having a direction suited to partial light source n.

In the reticle data generating processing shown in FIGS. 3C-1 and 3C-2, steps S321 to S323 form a pattern determination step (also regarded as an auxiliary pattern determination step).

In step S324, it is determined whether the processes in steps S321 to S323 have been done for all the partial light sources determined in step S302. If these processes have been done for all the partial light sources, the process advances to step S306. If these processes have not been done for all the partial light sources, the process returns to step S320 to set an unprocessed partial light source.

In step S306, main patterns and auxiliary patterns (auxiliary patterns 21 to 2n) are merged to generate a reticle pattern. In step S307, reticle data is generated based on the reticle pattern. The reticle pattern and reticle data mentioned here are equivalent information except for the format.

Terms used in the specification will be explained. λ represents the wavelength of exposure light used in an exposure apparatus 100 (see FIG. 28), and NA represents the image-side numerical aperture of a projection optical system 140. σ represents the ratio between the numerical aperture of a light beam incident on a reticle 130 (the object plane of the projection optical system 140) via an illumination optical system 120 and the object-side numerical aperture of the projection optical system 140.

Since the exposure apparatus can take various NA values and λ values, it is convenient to normalize the pattern size by (λ/NA). For example, for λ=193 nm and NA=1.35, a pattern size of 45 nm is normalized to 0.315. This normalization will be referred to as k1 conversion in the specification.

A pattern size on the reticle plane and that on the substrate plane are different by the magnification of the projection optical system. For descriptive convenience, the magnification of the projection optical system is assumed to be 1:1. Hence, a coordinate system on the reticle plane and that on the substrate plane have a one-to-one correspondence.

Several embodiments will be described below.

[First Embodiment]

An embodiment of reticle data generating processing shown in FIG. 3A will be described. In this embodiment, target patterns are classified into a plurality of direction groups. For each direction group, a main pattern is determined by optical proximity correction under a partial light source corresponding to the direction. An auxiliary pattern which interferes with the main pattern is determined.

The exposure apparatus has an ArF light source which emits exposure light with a wavelength of 193 nm. The projection optical system has an NA of 1.35 and optical system is aberration free. No resist is considered.

Figure 4:
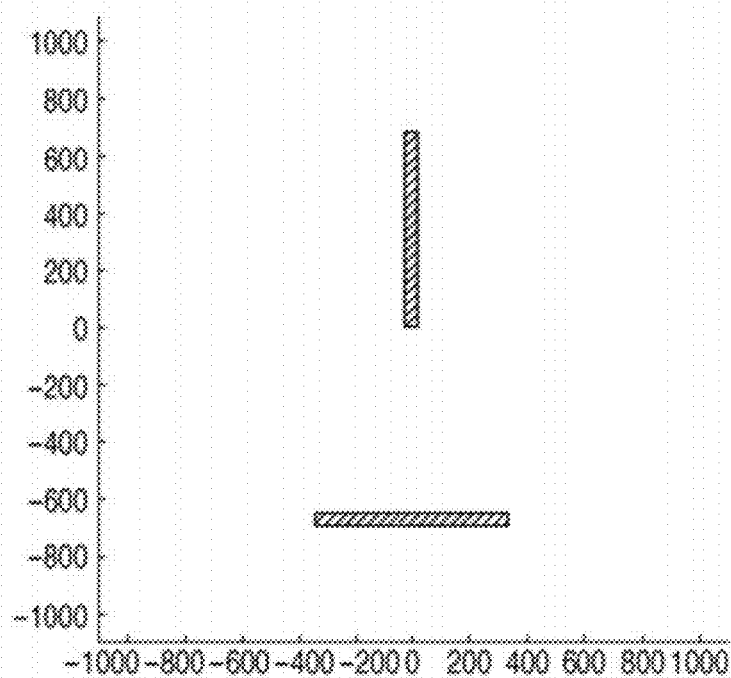
FIG. 4 is a view exemplifying target patterns.

Target patterns are line patterns as shown in FIG. 4, and have a line width of 45 nm and a length of 675 nm. In FIG. 4, a blank portion is a light-transmitting portion, the line pattern is a light-shielding pattern having a transmittance of 0, and the transmittance of the background is 1. All phases are 0, and the unit is nm.

Figure 5:
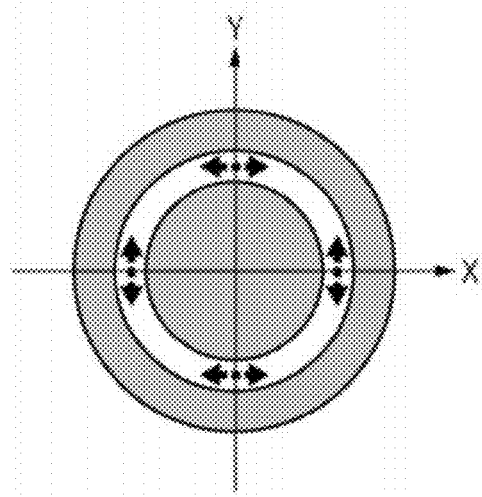
FIG. 5 is a view exemplifying a light source distribution.

An effective light source used for exposure is an annular illumination as shown in FIG. 5. In FIG. 5, a gray circle represents σ≦1, and a blank portion is a light-emitting portion. The direction of an arrow in FIG. 5 is the direction of polarization, which is so-called tangential polarization.

The target patterns in FIG. 4 are classified into directions as shown in FIGS. 6A and 6B. The angle range Δθ of the pattern is set to 15°, and the target patterns are classified using θ=0, 30, 60, 90, 120, 150. The target patterns in FIG. 4 are classified into 90° and 0° patterns.

Figure 7A:
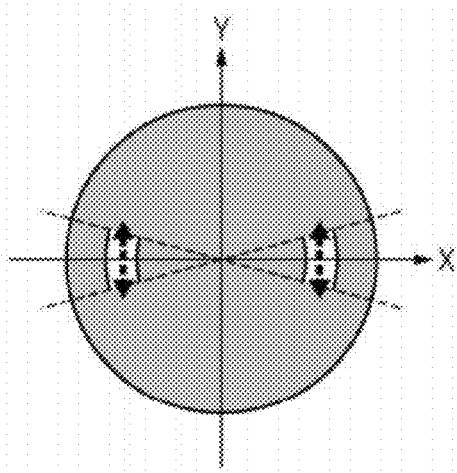
FIGS. 7A and 7B are views exemplifying partial light sources extracted from the light source distribution.
Figure 7B:
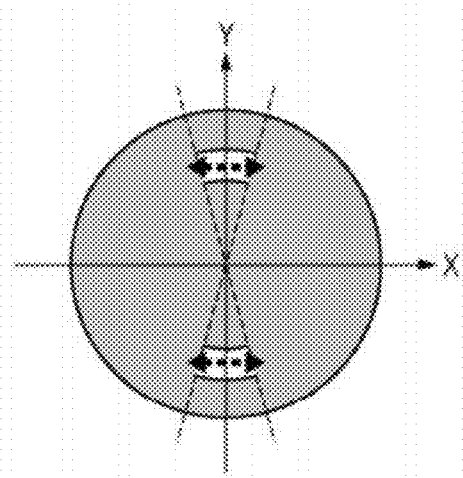

Partial light sources suited to the respective patterns are extracted from the effective light source in FIG. 5. As a result, a partial light source suited to the pattern in FIG. 6A is extracted as shown in FIG. 7A, and that suited to the pattern in FIG. 6B is extracted as shown in FIG. 7B. The direction of the center line of the light source is defined by 0° and 180° in FIG. 7A and 90° and −90° in FIG. 7B, and the divergence angle α is 15°. The radius of the pupil is set to 1, and the half pitch (HP) of the target pattern=45 (nm) is converted into k1=0.315. From them, the radial center is calculated to be 0.79.

Main patterns deformed to resolve the target patterns in FIGS. 6A and 6B, and auxiliary patterns which assist them are obtained. FIG. 8A shows an aerial image formed on the image plane of the projection optical system when all patterns equal to the target patterns are illuminated with the partial light source in FIG. 7A. FIG. 8B shows an aerial image formed on the image plane of the projection optical system when all patterns equal to the target patterns are illuminated with the partial light source in FIG. 7B. The partial light source in FIG. 7A may be adopted as an illumination condition to calculate the aerial image of only the target pattern in FIG. 6A. However, by calculating the aerial image of all patterns, the proximity effect of patterns in different directions can be taken into account.

Main and auxiliary patterns are determined based on the aerial images, attaining patterns in FIGS. 9A and 9B for the target patterns in FIGS. 6A and 6B, respectively. The angle range of the auxiliary pattern is set to a maximum one (i.e., no angle range is set). The pattern direction is 90° and Δθ'=90° in FIG. 9A, and the pattern direction is 0° and Δθ'=90° in FIG. 9B.

Figure 11:
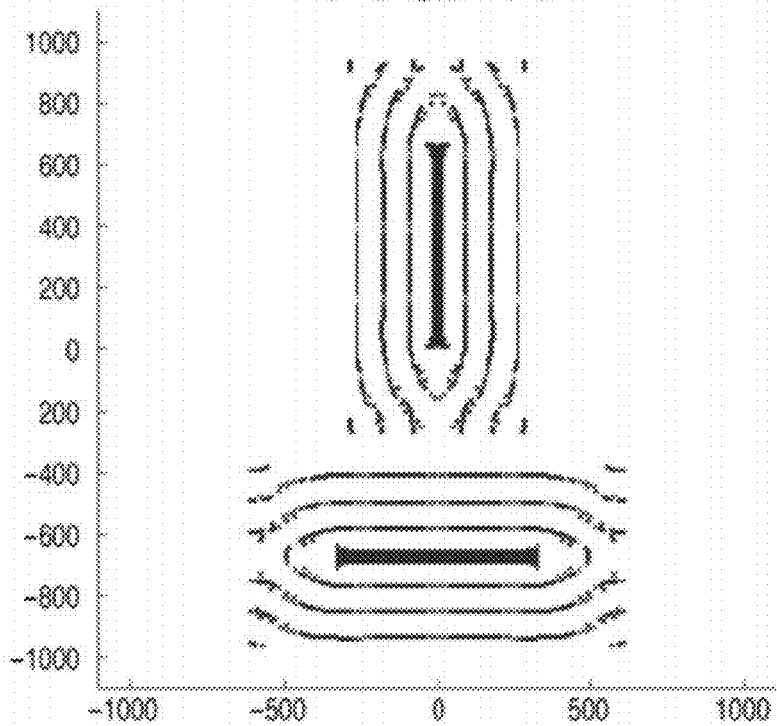
FIG. 11 is a view exemplifying a reticle pattern obtained by merging patterns attained based on partial light sources and target patterns classified into given direction groups.

The patterns in FIGS. 9A and 9B are merged, and overlapping patterns are removed, so a reticle pattern in FIG. 11 is obtained. In practice, the reticle pattern in FIG. 11 has a dimension divided by the magnification of the projection optical system of the exposure apparatus. However, FIG. 11 shows a reticle pattern converted into a size on the image plane.

Figure 10:
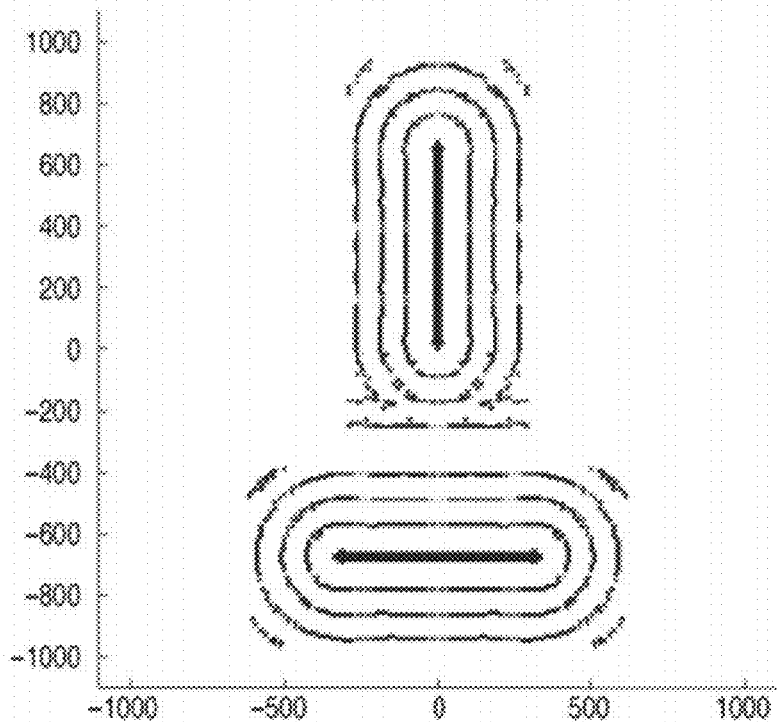
FIG. 10 is a view exemplifying a reticle pattern obtained based on the light source distribution and all target patterns.

In contrast, FIG. 10 shows a reticle pattern obtained from all the patterns in FIG. 4 using the exposure light source in FIG. 5 as an illumination condition. The reticle patterns in FIGS. 10 and 11 are different in main pattern shape and auxiliary pattern shape.

A reticle is produced according to the reticle pattern data, and a substrate is exposed using the reticle. It is then confirmed whether an image formed on the substrate by exposure coincides with a target image.

Figure 12:
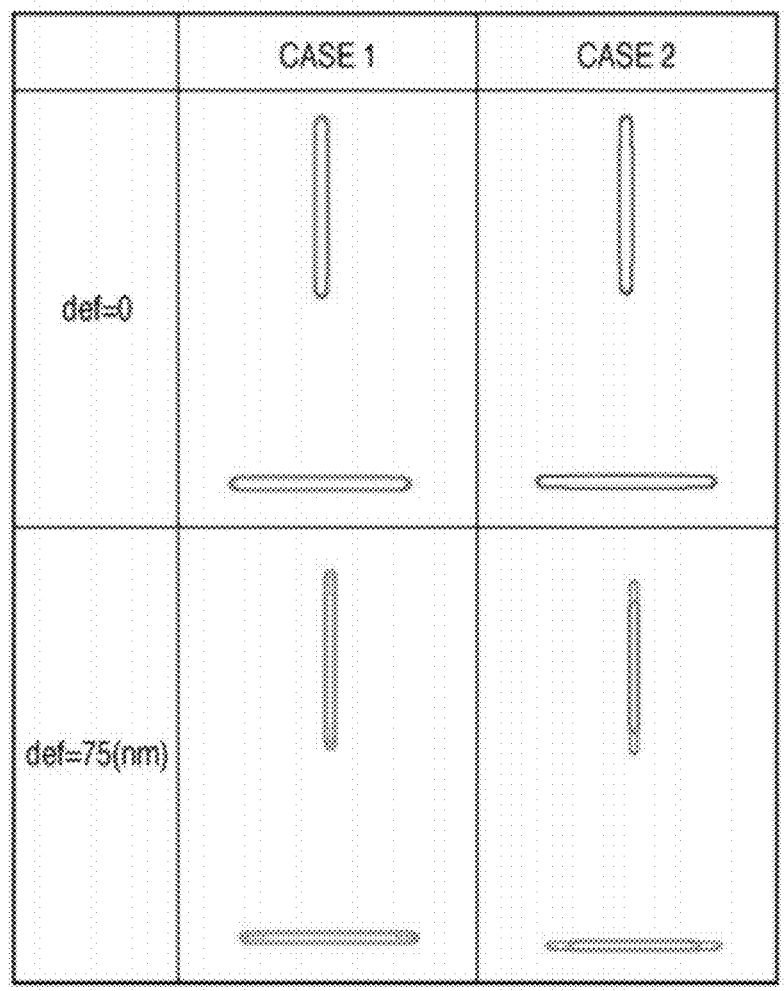
FIG. 12 is a table exemplifying the two-dimensional images of aerial images obtained based on the exposure light source and the reticle patterns of FIGS. 10 and 11.

To evaluate reticle data, an aerial image formed by it was evaluated. More specifically, simulation was done to illuminate the reticle patterns of FIGS. 10 and 11 under the same illumination condition (annular illumination in FIG. 5) and expose substrates. FIG. 12 is a table showing the simulation results. Case 2 represents an image obtained from the reticle pattern of FIG. 10, and case 1 represents an image obtained from the reticle pattern of FIG. 11.

As is apparent from FIG. 12, the results of exposure are different though the illumination condition is the same. A reticle pattern optimized for the light source distribution (annular illumination) itself used for exposure exhibits good shape reproducibility but slightly poor NILS. In contrast, a reticle pattern optimized for a dipole illumination serving as a partial light source extracted from the light source distribution exhibits slightly poor shape reproducibility but very good NILS. These patterns represent well the features of images illuminated by the annular illumination and dipole illumination.

A reticle pattern optimized for a partial light source extracted from the light source distribution provides a pattern which strongly interferes with the partial light source. Even under an illumination condition which is not always optimum for a fine pattern, the present invention can be applied to make the performance close to one under an illumination condition suitable for the fine pattern.

[Second Embodiment]

An embodiment of reticle data generating processing shown in FIG. 3A will be described. In this embodiment, target patterns are classified into a plurality of direction groups. For each direction group, a main pattern is determined by optical proximity correction under a partial light source corresponding to the direction. An auxiliary pattern which interferes with the main pattern is determined.

The exposure apparatus is identical to that in the first embodiment. More specifically, the exposure apparatus has an ArF light source which emits exposure light with a wavelength of 193 nm. The projection optical system has an NA of 1.35 and a optical system is aberration free. No resist is considered.

Figure 13:
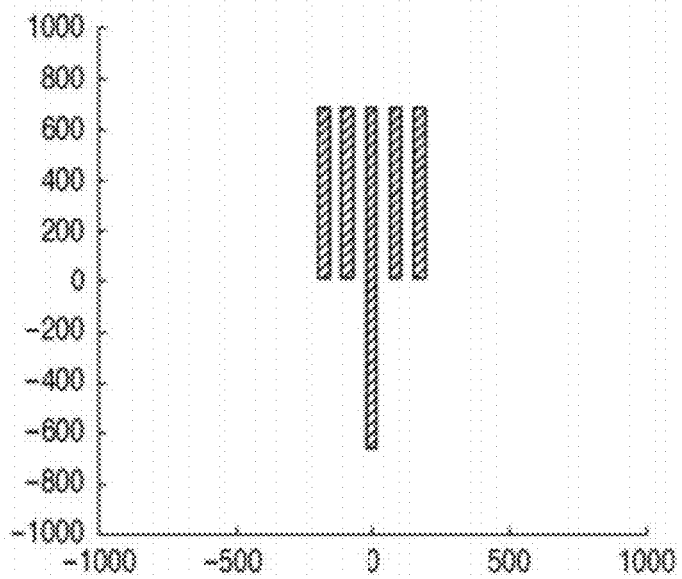
FIG. 13 is a view exemplifying target patterns.

Target patterns are five bar line patterns as shown in FIG. 13, and have a line width of 45 nm. The long bar at the center has a length of 1,350 nm, and the remaining bars have a length of 675 nm. In FIG. 13, a blank portion is a light-transmitting portion, the line pattern is a light-shielding pattern having a transmittance of 0, and the transmittance of the background is 1. All phases are 0, and the unit is nm.

Figure 14:
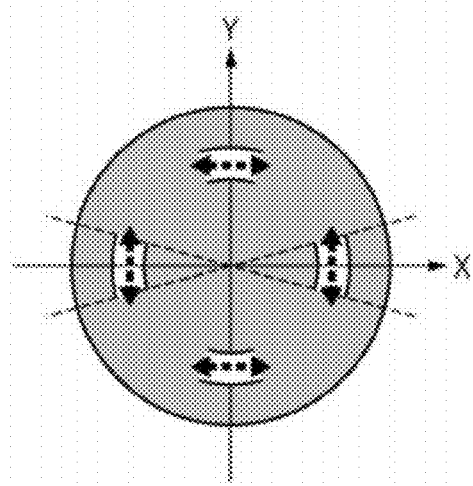
FIG. 14 is a view exemplifying a light source distribution.

An effective light source used for exposure is a quadrupole illumination as shown in FIG. 14. In FIG. 14, a gray circle represents a 1, and a blank portion is a light-emitting portion. The direction of an arrow in FIG. 14 is the direction of polarization, which is so-called tangential polarization.

Similar to the first embodiment, the patterns are classified and partial light sources are extracted. Since patterns as shown in FIG. 13 extend in only one direction, only a set of patterns as shown in FIG. 13 is extracted by classification. As a partial light source suited to such patterns, a partial light source as shown in FIG. 15 is extracted.

Figure 15:
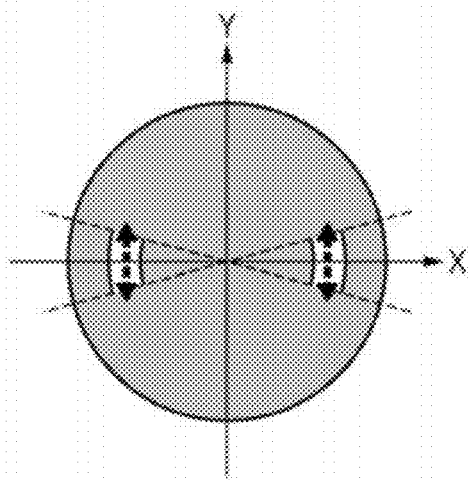
FIG. 15 is a view exemplifying a partial light source extracted from the light source distribution.

Simulation was done to compare a reticle pattern obtained by optimizing the target patterns in FIG. 13 under the same quadrupole illumination as a light source used for actual exposure with a reticle pattern obtained by optimizing the target patterns under a partial light source as shown in FIG. 15. FIG. 16 is a table showing the simulation results. FIG. 16 shows a reticle pattern (case 3) optimized under an actual light source distribution, a reticle pattern (case 4) optimized under a partial light source, and a reticle pattern (case 5) obtained by simplifying auxiliary patterns on the reticle pattern optimized under the partial light source.

In the reticle pattern of case 4, the angle range was set to $\theta'=90°$ when deriving an auxiliary pattern. In the reticle pattern of case 5, the angle range was set to $\theta'=30°$ to simplify an auxiliary pattern when deriving an auxiliary pattern. In FIG. 16, the middle stage shows two-dimensional images in the best focus on the substrate plane, and the bottom stage shows two-dimensional images with a defocus of 75 nm.

As is apparent from FIG. 16, an image which is uniform in line width, does not shorten, and is almost equal to a target pattern is attained near the best focus. The reticle pattern (case 4) optimized under the partial light source is better in focusing characteristic than the reticle pattern (case 3) optimized under the light source distribution for actual use. Case 5 in which the auxiliary pattern is simplified exhibits almost the same focusing characteristic as that in case 4 in which the auxiliary pattern is not simplified.

[Third Embodiment]

An embodiment of reticle data generating processing shown in FIGS. 3B-1 and 3B-2 will be described. In this embodiment, main patterns are determined based on all target patterns using an effective light source as an illumination condition. Thereafter, an auxiliary pattern is determined using each partial light source as an illumination condition.

The exposure apparatus has an ArF light source which emits exposure light with a wavelength of 193 nm. The projection optical system has an NA of 1.35 and a optical system is aberration free. No resist is considered.

Figure 17:
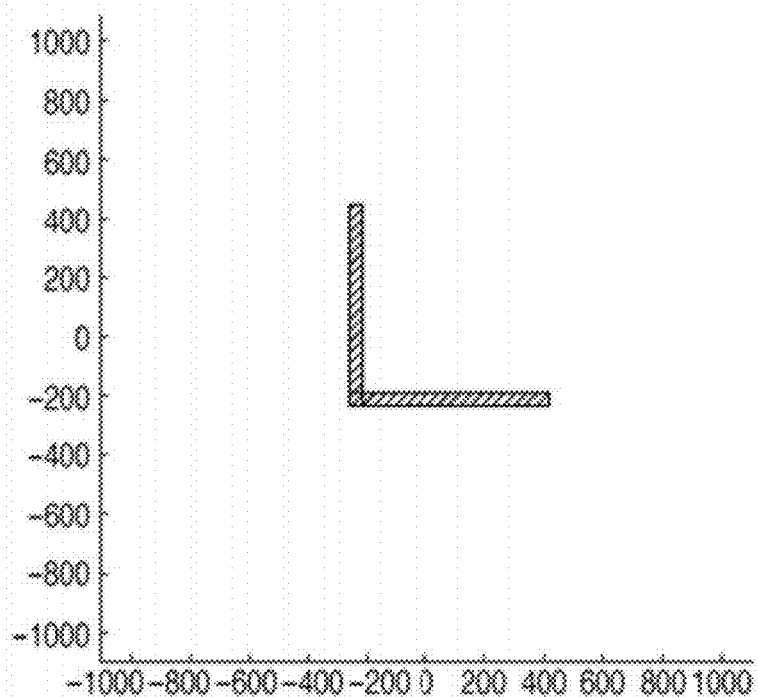
FIG. 17 is a view exemplifying target patterns.

Target patterns line patterns which form an L shape as shown in FIG. 17, and have a line width of 45 nm and a length of 675 nm in both the longitudinal and lateral directions. In FIG. 17, a blank portion is a light-transmitting portion, the line pattern is a light-shielding pattern having a transmittance of 0, and the transmittance of the background is 1. All phases are 0, and the unit is nm.

Figure 18:
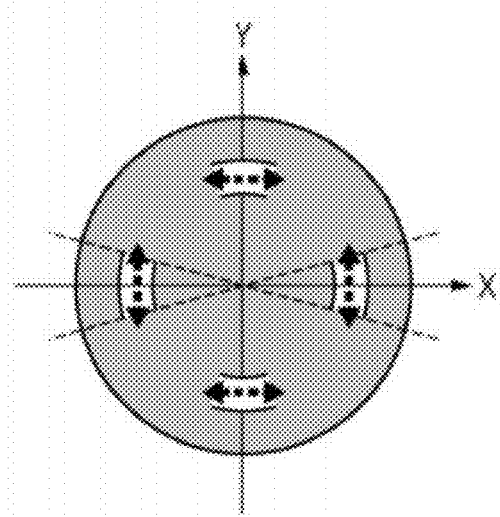
FIG. 18 is a view exemplifying a light source distribution.

An effective light source used for exposure is a quadrupole illumination as shown in FIG. 18. In FIG. 18, a gray circle represents $\sigma \leqq 1$, and a blank portion is a light-emitting portion. The direction of an arrow in FIG. 18 is the direction of polarization, which is so-called tangential polarization.

Figure 19:
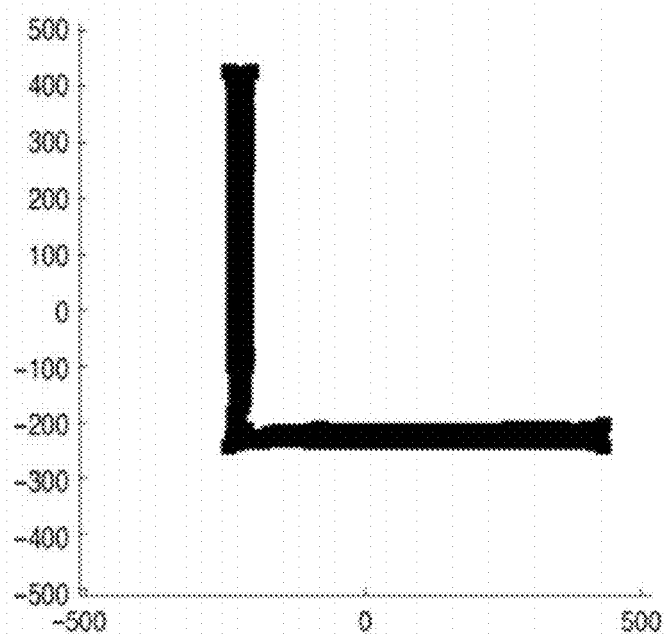
FIG. 19 is a view exemplifying deformed main patterns.
Figure 20A:
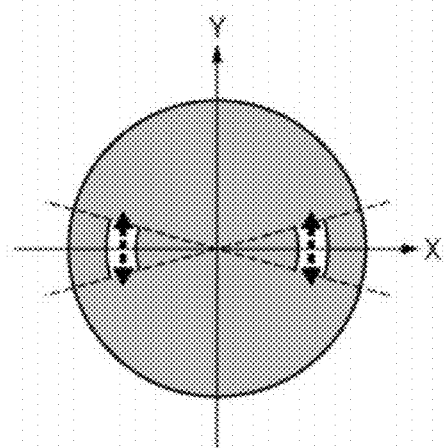
FIGS. 20A and 20B are views exemplifying partial light sources extracted from the light source distribution.
Figure 20B:
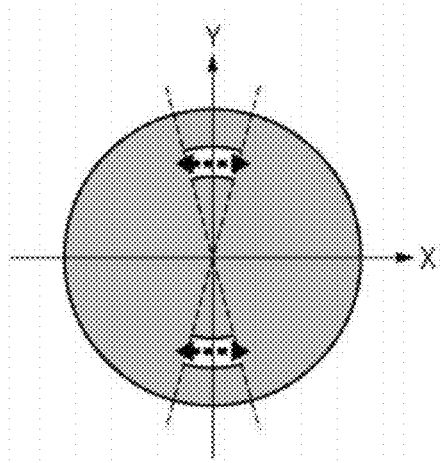

First, all target patterns are deformed under a light source distribution used for exposure, thereby determining main patterns. FIG. 19 shows the deformed main patterns. According to the same method as in the first embodiment, partial light sources as shown in FIGS. 20A and 20B are extracted. FIGS. 20A and 20B show partial light sources suited to the directions and pitches of target patterns classified into two direction groups in order to extract partial light sources.

FIGS. 21A and 21B are views showing calculated aerial images formed on the image plane of the projection optical system when deformed main patterns are illuminated with the partial light sources as shown in FIGS. 20A and 20B. Based on these aerial images, peak positions in the peripheral regions of all target patterns are obtained. Peak positions within the angle range of $\theta'=30°$ are extracted as auxiliary pattern positions.

FIGS. 22A and 22B show auxiliary patterns determined based on the aerial images of FIGS. 21A and 21B, respectively. FIGS. 22A and 22B also show target patterns for reference in addition to the auxiliary patterns.

Thereafter, the deformed main patterns and their auxiliary patterns are merged to determine a reticle pattern. FIG. 24 shows the reticle pattern obtained in this way, which will be described together with results in the fourth embodiment.

[Fourth Embodiment]

An embodiment of reticle data generating processing shown in FIGS. 3C-1 and 3C-2 will be described. In this embodiment, main patterns are determined based on all target patterns using an effective light source as an illumination condition. An auxiliary pattern is then determined using each partial light source as an illumination condition. In the determination of an auxiliary pattern, an auxiliary pattern is placed in only the peripheral region of a main pattern suited to a partial light source.

Similar to the third embodiment, target patterns are line patterns which form an L shape as shown in FIG. 17, and have a line width of 45 nm and a length of 675 nm in both the longitudinal and lateral directions.

An effective light source used for exposure is a quadrupole illumination as shown in FIG. 18.

First, all target patterns are deformed under a light source distribution used for exposure, thereby attaining determined main patterns as shown in FIG. 19, like the third embodiment. Similar to the third embodiment, partial light sources are those as shown in FIGS. 20A and 20B, and aerial images are those as shown in FIGS. 21A and 21B.

Main patterns are classified into directions. Part of a main pattern classified into a direction corresponding to the direction of a partial light source is extracted. In the fourth embodiment, part of a main pattern corresponding to a partial light source is used when determining an auxiliary pattern. More specifically, peak positions in only the peripheral region of the main pattern corresponding to the partial light source are obtained based on an aerial image calculated under the partial light source. Peak positions within the angle range of $\theta'=45°$ are determined as auxiliary pattern positions.

FIGS. 23A and 23B show auxiliary patterns determined based on the aerial images of FIGS. 21A and 21B, respectively. FIGS. 23A and 23B also show target patterns in directions corresponding to partial light sources for reference in addition to the auxiliary patterns.

Subsequently, the deformed main patterns and their auxiliary patterns are merged to determine a reticle pattern.

FIG. 24 shows the results of simulating two-dimensional images formed when the reticle patterns in the third and fourth embodiments are illuminated with the same light source distribution. In FIG. 24, the top stage shows a reticle pattern (case 6) optimized under a light source distribution for actual use, a reticle pattern (case 7) obtained in the third embodiment, and a reticle pattern (case 8) obtained in the fourth embodiment. The middle stage shows two-dimensional images in the best focus, and the bottom stage shows two-dimensional images with a defocus of 75 nm.

As is apparent from the results shown in FIG. 24, an image which is uniform in line width, does not shorten, and is almost equal to a target pattern is attained near the best focus.

However, in cases 6 and 8, a portion where the lines of auxiliary patterns cross each other is formed as an image. In case 7, no image is formed by auxiliary patterns, and the reticle pattern is simple.

In case 8, the reticle pattern is simple, but there is a fear of forming the image of auxiliary patterns because the lines of auxiliary patterns cross each other in a pattern in which lines in different directions are linked. However, if the formation of an image to this extent is permitted, the reticle pattern in case 8 can be adopted because of good shape reproducibility and the like.

Figure 28:
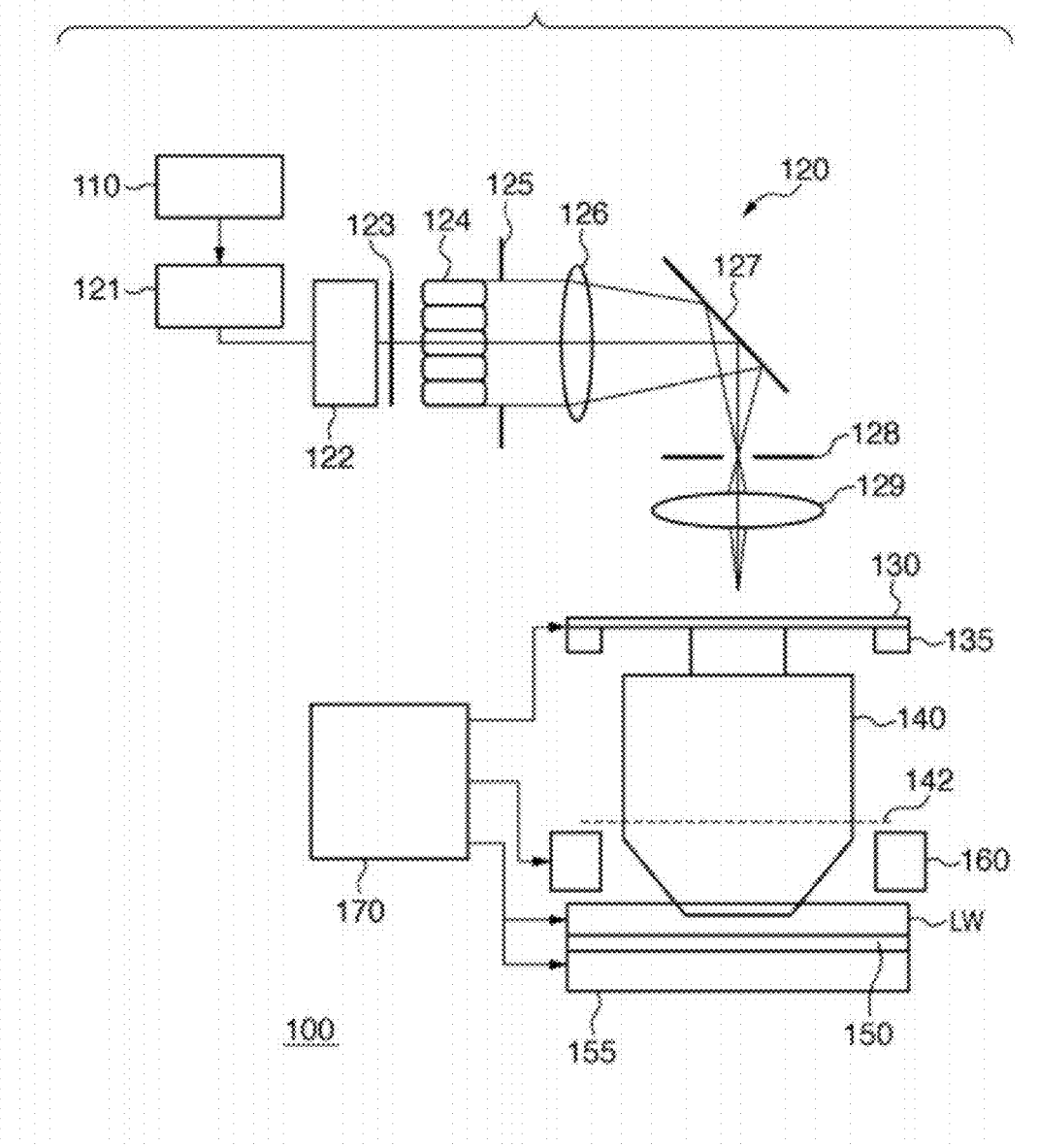
FIG. 28 is a block diagram showing the schematic arrangement of an exposure apparatus.

An exposure apparatus 100 will be explained next with reference to FIG. 28. FIG. 28 is a block diagram showing the schematic arrangement of the exposure apparatus 100. A reticle 130 is one produced based on reticle data generated by executing the above-described reticle data generating program.

The exposure apparatus 100 is an immersion exposure apparatus. A liquid LW is supplied between a projection optical system 140 and a substrate 150. The pattern of the reticle 130 is projected onto the substrate 150 via the projection optical system 140 and liquid LW, thereby exposing the substrate 150. In this example, the exposure apparatus 100 is of the step & scan type, but can be of the step & repeat type or another type.

As shown in FIG. 28, the exposure apparatus 100 includes a light source 110, an illumination optical system 120, a reticle stage 135 which holds the reticle 130, the projection optical system 140, a substrate stage 155 which holds the substrate 150, a liquid supply/recovery unit 160, and a main control system 170. The light source 110 and illumination optical system 120 constitute an illumination device which illuminates the reticle 130.

The light source 110 is an excimer laser such as a KrF excimer laser having a wavelength of about 248 nm or an ArF excimer laser having a wavelength of about 193 nm. However, the type and number of light sources 110 are not particularly limited. For example, an $F_2$ laser having a wavelength of about 157 nm is usable as the light source 110.

The illumination optical system 120 illuminates the reticle 130 with light emitted by the light source 110. The illumination optical system 120 is configured to be able to illuminate the reticle 130 in various illumination modes (illumination conditions) such as a modified illumination (e.g., quadrupole illumination). The illumination optical system 120 includes, for example, a beam shaping optical system 121, condensing optical system 122, polarization control unit 123, optical integrator 124, and aperture stop 125. The illumination optical system 120 further includes a condenser lens 126, deflection mirror 127, masking blade 128, and imaging lens 129.

The beam shaping optical system 121 may include, for example, a beam expander formed from a plurality of cylindrical lenses. The beam shaping optical system 121 converts the aspect ratio of the sectional shape of collimated light from the light source 110 into a predetermined value (e.g., converts the sectional shape from a rectangle to a square). The beam shaping optical system 121 shapes light emitted by the light source 110 into light having a size and an angle of divergence necessary to illuminate the optical integrator 124.

The condensing optical system 122 includes a plurality of optical elements, and efficiently guides light shaped by the beam shaping optical system 121 to the optical integrator 124.

The condensing optical system 122 includes, for example, a zoom lens system, and adjusts the shape and angle of light which enters the optical integrator 124.

The polarization control unit 123 includes, for example, a polarizing element and is arranged at a position nearly conjugate to a pupil plane 142 of the projection optical system 140. The polarization control unit 123 controls the polarization state of a predetermined region of an effective light source formed on the pupil plane 142 of the projection optical system 140.

The optical integrator 124 has a function of uniforming illumination light which illuminates the reticle 130, converting the angular distribution of incident light into a positional distribution, and outputting the resultant light. The optical integrator 124 is, for example, a fly-eye lens whose incident surface and exit surface hold a Fourier transform relationship. The fly-eye lens is formed by combining a plurality of rod lenses (i.e., microlens elements). However, the optical integrator 124 is not limited to the fly-eye lens and may be, for example, optical rods, diffraction gratings, or a pair of cylindrical lens array plates arranged perpendicular to each other.

The aperture stop 125 is located at a position which is immediately after the exit surface of the optical integrator 124 and is nearly conjugate to the effective light source formed on the pupil plane 142 of the projection optical system 140. The aperture shape of the aperture stop 125 corresponds to the light intensity distribution (i.e., effective light source shape) of the effective light source formed on the pupil plane 142 of the projection optical system 140. In other words, the aperture stop 125 controls the light intensity distribution of the effective light source. The aperture stop 125 is switchable depending on the illumination mode. With or without the aperture stop, the shape of the effective light source may be adjusted by arranging a diffractive optical element (CGH) or prism on the side of the light source with respect to the optical integrator 124.

The condenser lens 126 converges light which has emerged from a secondary light source formed near the exit surface of the optical integrator 124 and passed through the aperture stop 125. The converged light uniformly illuminates the masking blade 128 via the deflection mirror 127.

The masking blade 128 is arranged at a position nearly conjugate to the reticle 130 and includes a plurality of movable light-shielding plates. The masking blade 128 forms an almost rectangular opening corresponding to the effective area of the projection optical system 140. The light having passed through the masking blade 128 is used as illumination light which illuminates the reticle 130. The imaging lens 129 forms, on the reticle 130, an image of the light having passed through the opening of the masking blade 128.

The reticle 130 is produced based on reticle data generated by a processing apparatus 1 described above, and has a circuit pattern (main pattern) to be transferred on a substrate and an auxiliary pattern. The reticle stage 135 supports and drives the reticle 130. Light diffracted by the reticle 130 impinges on the substrate 150 via the projection optical system 140 and liquid LW. The reticle 130 and substrate 150 are arranged to have an optically conjugate relationship. The exposure apparatus 100 transfers the circuit pattern of the reticle 130 onto the substrate 150 by synchronously scanning them. When the exposure apparatus 100 is of the step & repeat type, it exposes the substrate 150 while the reticle 130 and substrate 150 stay still.

The reticle stage 135 supports the reticle 130 via a reticle chuck and is connected to a driving mechanism (not shown). The driving mechanism (not shown) is formed from a linear motor or the like, and drives the reticle stage 135 in the X-, Y-, and Z-axis directions and the rotational directions about the respective axes. Note that the scanning direction on the reticle 130 or substrate 150 is defined as the Y-axis direction, a direction perpendicular to it is defined as the X-axis direction, and a direction perpendicular to the surface of the reticle 130 or substrate 150 is defined as the Z-axis direction.

The projection optical system 140 projects the circuit pattern of the reticle 130 onto the substrate 150. The projection optical system 140 can be a dioptric system, catadioptric system, or catoptric system. The final optical element (final surface) of the projection optical system 140 is coated (for protection) to reduce the influence of the liquid LW supplied from the liquid supply/recovery unit 160.

The circuit pattern of the reticle 130 is projected (transferred) on the substrate 150. However, the substrate 150 can be replaced with a glass plate or another substrate. The substrate 150 is coated with a resist.

The substrate stage 155 supports the substrate 150 and moves it in the X-, Y-, and Z-axis directions and the rotational directions about the respective axes using a linear motor, like the reticle stage 135.

The liquid supply/recovery unit 160 has a function of supplying the liquid LW to the space between the final optical element (final surface) of the projection optical system 140 and the substrate 150. The liquid supply/recovery unit 160 also has a function of recovering the liquid LW supplied to the space between the final optical element of the projection optical system 140 and the substrate 150. As the liquid LW, a substance is selected, which has a high transmittance for exposure light, prevents adhesion of dirt on (the final lens of) the projection optical system 140, and matches the resist process well.

The main control system 170 has a CPU and memory and controls the operation of the exposure apparatus 100. For example, the main control system 170 is electrically connected to the reticle stage 135, substrate stage 155, and liquid supply/recovery unit 160. The main control system 170 controls synchronous scanning of the reticle stage 135 and substrate stage 155. Based on the scanning direction and speed of the substrate stage 155 and the like in exposure, the main control system 170 controls switching between supply, recovery, and stop of the liquid LW. The main control system 170 performs illumination control especially based on information input from a monitor and input device and that from the illumination device. For example, the main control system 170 drives and controls the aperture stop 125 via a driving mechanism. The monitor and the monitor of the input device display control information of the main control system 170 and other kinds of information. The main control system 170 receives information on an effective light source in each embodiment described above, and forms the effective light source by controlling the aperture stop, diffractive optical element, prism, and the like.

In exposure, a light beam emitted by the light source 110 illuminates the reticle 130 via the illumination optical system 120. After passing through the reticle 130, the light beam which reflects the circuit pattern forms an image on the substrate 150 via the projection optical system 140 and liquid LW. The exposure apparatus 100 has excellent imaging performance and can provide devices (e.g., a semiconductor element, an LCD element, an image sensing element (e.g., a CCD), and a thin-film magnetic head) with high throughput and good economical efficiency.

A device manufacturing method according to the embodiment of the present invention is preferable for manufacturing a device such as a semiconductor device or liquid crystal device. This method can include a step of exposing a substrate coated with a photoresist using the exposure apparatus, and a step of developing the exposed substrate. The device manufacturing method can further include other well-known steps (e.g., oxidation, film formation, vapor deposition, doping, planarization, etching, resist removal, dicing, bonding, and packaging).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-003996, filed Jan. 9, 2009, which is hereby incorporated by reference herein in its entirety.

What is claimed is:

1. A non-transitory computer readable storage medium storing a program for causing a computer to generate reticle data for producing a reticle used in an exposure apparatus in which an illumination optical system illuminates a reticle and a projection optical system projects a pattern of the reticle onto a substrate, the program causing the computer to execute processing including the steps of:

classifying target patterns to be formed on a substrate into a plurality of direction groups;

determining, for each of the plurality of direction groups, a partial light source that is a part of an effective light source distribution formed on a pupil of the projection optical system by the illumination optical system, the partial light source being for resolution of a target pattern belonging to the direction group;

executing, for each of a plurality of partial light sources, processing of determining a pattern to be placed on a reticle when each partial light source is used as an illumination condition; and merging patterns determined in the step of executing processing, wherein in the step of classifying target patterns, letting $\theta(0 \leq \theta < \pi, \theta = 2(j-1)\Delta\theta, j = 1, \ldots, \pi/(2\Delta\theta))$ be an angle between a longitudinal direction of a target pattern and an x-axis in an x-y coordinate system defined on a reticle plane, a target pattern falling within an angle range of $\theta = 2(j-1)\Delta\theta \pm \Delta\theta$ is classified into a direction group of a direction j, wherein $\Delta\theta$ is an arbitrary angle.

2. The medium according to claim 1, wherein the pattern to be placed on a reticle includes a main pattern and an auxiliary pattern; and in the step of executing processing, processing of determining main and auxiliary patterns to be placed on a reticle when each partial light source is used as an illumination condition is executed.

3. The medium according to claim 2, wherein the auxiliary pattern is determined based on a peak position of a light intensity in an aerial image formed by the main pattern.

4. The medium according to claim 1, wherein the pattern to be placed on a reticle includes a main pattern and an auxiliary pattern;

the reticle data generating program causes the computer to further execute the step of determining a main pattern to be placed on a reticle by using the effective light source distribution as an illumination condition; and in the step of executing processing, processing of calculating an aerial image formed by the main pattern determined in the step of determining a main pattern when each partial light source is used as an illumination condition, and determining an auxiliary pattern based on the aerial image is executed for each of the plurality of partial light sources.

5. The medium according to claim 1, wherein
the pattern to be placed on a reticle includes a main pattern and an auxiliary pattern;
the reticle data generating program causes the computer to further execute the step of determining a main pattern to be placed on a reticle by using the effective light source distribution as an illumination condition; and
in the step of executing processing,
main patterns determined in the step of determining a main pattern are classified into the plurality of direction groups; and
processing of calculating an aerial image formed by the main pattern determined in the step of determining a main pattern when each partial light source is used as an illumination condition, and determining, based on the aerial image, an auxiliary pattern in only a peripheral region of a main pattern belonging to a direction group corresponding to the partial light source determined as the illumination condition is executed for each of the plurality of partial light sources.

6. The medium according to claim 2, wherein the main pattern is determined by performing optical proximity correction for a target pattern.

7. The medium according to claim 1, wherein in the step of determining a region, as a partial light source for resolution of a target pattern belonging to the direction group of the direction j, a region where a region having an angle of $\theta \pm \pi/2$ between a center line of the partial light source and the x-axis and having a divergence angle of $\pm \alpha$ ($\alpha < \pi/2$) with respect to the center line overlaps the effective light source distribution is determined;
wherein $\alpha$ is an arbitrary angle.

8. The medium according to claim 7, wherein
the pattern to be placed on a reticle includes a main pattern and an auxiliary pattern; and
in the step of executing processing, processing of determining main and auxiliary patterns to be placed on a reticle when each partial light source is used as an illumination condition is executed; and wherein
in the step of executing processing, when an angle between the x-axis and a line linking a peak position of interest of a light intensity in an aerial image calculated using, as an illumination condition, a partial light source having the angle of $\theta \pm \pi/2$ between the center line and the x-axis, and a peak position closest to the peak position of interest falls within an angle range of $\theta \pm \Delta\theta'(0 < \Delta\theta' \leq \pi/2)$, the peak position of interest is determined as an auxiliary pattern position;
wherein $\Delta\theta'$ is an arbitrary angle.

9. A computer-implemented method of generating reticle data for producing a reticle used in an exposure apparatus in which an illumination optical system illuminates a reticle and a projection optical system projects a pattern of the reticle onto a substrate, the method comprising the steps of:
classifying target patterns to be formed on a substrate into a plurality of direction groups;
determining, by one or more processors for each of the plurality of direction groups, a partial light source that is a part of an effective light source distribution formed on a pupil of the projection optical system by the illumination optical system, the partial light source being for resolution of a target pattern belonging to the direction group;
executing, by one or more processors for each of a plurality of partial light sources determined in the step of extracting a region, processing of determining a pattern to be placed on a reticle when each partial light source is used as an illumination condition; and
merging patterns determined in the step of executing processing,
wherein in the step of classifying target patterns, letting $\theta(0 \leq \theta < \pi, \theta = 2(j-1)\Delta\theta, j = 1, \ldots, \pi/(2\Delta\theta))$ be an angle between a longitudinal direction of a target pattern and an x-axis in an x-y coordinate system defined on a reticle plane, a target pattern falling within an angle range of $\theta = 2(j-1)\Delta\theta \pm \Delta\theta$ is classified into a direction group of a direction j;
wherein $\Delta\theta$ is an arbitrary angle.

* * * * *